(12) United States Patent
Zhang et al.

(10) Patent No.: US 11,875,520 B2
(45) Date of Patent: Jan. 16, 2024

(54) METHOD AND SYSTEM FOR GENERATING A FUSION IMAGE

(71) Applicant: ZHEJIANG DAHUA TECHNOLOGY CO., LTD., Zhejiang (CN)

(72) Inventors: Dong Zhang, Hangzhou (CN); Song Wang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 338 days.

(21) Appl. No.: 17/321,554

(22) Filed: May 17, 2021

(65) Prior Publication Data

US 2021/0271937 A1   Sep. 2, 2021

Related U.S. Application Data

(63) Continuation of application No. PCT/CN2019/110585, filed on Oct. 11, 2019.

(30) Foreign Application Priority Data

Nov. 21, 2018   (CN) .......................... 201811390455.3

(51) Int. Cl.
*G06T 7/30* (2017.01)
*G06T 5/20* (2006.01)
*G06F 18/25* (2023.01)

(52) U.S. Cl.
CPC .............. *G06T 7/30* (2017.01); *G06F 18/251* (2023.01); *G06F 18/253* (2023.01); *G06T 5/20* (2013.01)

(58) Field of Classification Search
CPC ... G06T 7/30; G06T 5/20; G06T 2207/10024; G06T 5/008; G06T 5/50;
(Continued)

(56) References Cited

U.S. PATENT DOCUMENTS 9,053,558 B2 *   6/2015   Shen ....................... G06T 5/009
9,224,192 B2 * 12/2015   Vajen ........................ G06T 5/50
(Continued)

FOREIGN PATENT DOCUMENTS

CN         1545064 A     11/2004
CN       101546428 A      9/2009
(Continued)

OTHER PUBLICATIONS

Karali et al, Multiscale contrast direction adaptive image fusion technique for MWIR-LWIR image pairs and LWIR multifocus infrared images, vol. 54, No. 13 / May 1, 2015 / Applied Optics (Year: 2015).*

(Continued)

*Primary Examiner* — Andrae S Allison
(74) *Attorney, Agent, or Firm* — METIS IP LLC

(57) ABSTRACT

A method and system for generating a fusion image. The method may include obtaining a first image and a second image of a same scene. Pixels of at least a part of the first image may correspond to pixels of at least a part of the second image. The method may include generating, based on the first image, a first low-frequency image corresponding to a low-frequency component of the first image, the first low-frequency image including a plurality of first pixels. The method may include generating, based on the second image, a first high-frequency image corresponding to a high-frequency component of the second image, the first high-frequency image including a plurality of second pixels, the plurality of second pixels corresponding to the plurality of first pixels. The method may include determining, based on the first low-frequency image and the first high-frequency image, a featuring region in the first high-frequency image, wherein the featuring region and a region of the first image that corresponds to the featuring region have different lumi- (Continued)

100 nance transition trends. The method may further include correcting the second pixels in the featuring region based at least in part on the first low-frequency image. And the method may also include generating a fusion image based at least in part on the first low-frequency image, and the first high-frequency image.

20 Claims, 15 Drawing Sheets

(58) Field of Classification Search
CPC . G06T 2207/10048; G06T 2207/20016; G06T 2207/20221; G06T 2207/30232; G06T 7/33; G06T 2207/10004; G06F 18/251; G06F 18/253
See application file for complete search history.

(56) References Cited

U.S. PATENT DOCUMENTS

| | | | |
|---|---|---|---|
| 9,544,562 B2 * | 1/2017 | Schachter | H04N 9/77 |
| 9,723,224 B2 * | 8/2017 | Slaby | H04N 23/11 |
| 11,164,297 B2 * | 11/2021 | Kaneko | G06T 7/0002 |
| 11,227,371 B2 * | 1/2022 | Akashi | G06T 5/50 |
| 11,232,545 B2 * | 1/2022 | Cheng | G06T 5/003 |
| 2010/0290703 A1 | 11/2010 | Sim et al. | |
| 2014/0010472 A1 | 1/2014 | Xu | |
| 2017/0358067 A1 * | 12/2017 | Jung | G06T 5/20 |
| 2018/0227509 A1 | 8/2018 | Huang et al. | |
| 2018/0300906 A1 | 10/2018 | Lu et al. | |
| 2019/0102870 A1 | 4/2019 | Tokizaki et al. | |
| 2019/0318463 A1 | 10/2019 | Zhang et al. | |
| 2022/0156949 A1 * | 5/2022 | Al | G06T 5/002 |

FOREIGN PATENT DOCUMENTS

| | | |
|---|---|---|
| CN | 104079908 A | 10/2014 |
| CN | 104835130 A | 8/2015 |
| CN | 105069768 A | 11/2015 |
| CN | 106600572 A | 4/2017 |
| CN | 106897986 A | 6/2017 |
| EP | 2936799 B1 | 10/2018 |
| EP | 3534326 A1 | 9/2019 |
| WO | 2018120936 A1 | 7/2018 |
| WO | 2020103601 A1 | 5/2020 |

OTHER PUBLICATIONS

S. Zhenfeng, L. Jun, and C. Qimin, "Fusion of infrared and visible images based on focus measure operators in the curvelet domain," Appl. Opt. 51, 1910-1921 (2012). (Year: 2012).*

Paramanandham et al, Multi sensor image fusion for surveillance applications using hybrid image fusion algorithm, Multimed Tools Appl (2018) 77:12405-12436 (Year: 2017).*

Zhao, Zhou, and Yicong Zhou. "PLIP based unsharp masking for medical image enhancement." 2016 IEEE International Conference on Acoustics, Speech and Signal Processing (ICASSP). IEEE, 2016. (Year: 2016).*

International Search Report in PCT/CN2019/110585 dated Jan. 13, 2020, 4 pages.

Written Opinion in PCT/CN2019/110585 dated Jan. 13, 2020, 6 pages.

Liu, Zheng et al., Fusing Synergistic Information from Multi-Sensor Images: An Overview from Implementation to Performance Assessment, Information Fusion, 42: 127-145, 2017.

The Extended European Search Report in European Application No. 19887326.7 dated Nov. 17, 2021, 9 pages.

First Office Action in Chinese Application No. 201811390455.3 dated Jun. 21, 2022, 31 pages.

Li, Changxing et al., Infrared and Visible Image Fusion Based on Human Visual Characteristics, Journal of Xi'an University of Posts and Telecommunications, 21(6): 98-102, 2016.

Gao, Ying et al., Application of Improved Wavelet Transform Algorithm in Image Fusion, Laser Technology, 37(5): 690-695, 2013.

Liu, Kun et al., An Effective Infrared Image Fusion Algorithm, Fire Control & Command Control, 35(6): 10-13& 16, 2010.

Gan, Ling et al., Image Fusion Method Combining Non-subsampled Contourlet Transform and Guide Filtering, Infrared Technology, 40(5): 444-448&454, 2018.

Chen, Weibin et al., Fusion Algorithm of Infrared Images and Visible Images Based on Weighting, Aeronautical Computing Technique, 46(5): 73-76&81, 2016.

* cited by examiner

500

```
┌─────────────────────────────────────────────────────────┐
│ Performing a multi-scale decomposition on a first image │  510
│ and a second image respectively to obtain multi-scale   │
│ decomposition results                                    │
└─────────────────────────────────────────────────────────┘
                            │
                            ▼
┌─────────────────────────────────────────────────────────┐
│ For each pixel, determining whether the pixel is in a   │  520
│ featuring region according to the multi-scale           │
│ decomposition results                                    │
└─────────────────────────────────────────────────────────┘
                         │ Yes
                         ▼
┌─────────────────────────────────────────────────────────┐
│ Correcting second pixels in the first high-frequency    │  530
│ image according to the multi-scale decomposition        │
│ results, to make an amplitude and a sign of a second    │
│ pixel in the first high-frequency image match those in  │
│ the second high-frequency image of the pixel            │
│ respectively                                             │
└─────────────────────────────────────────────────────────┘
                            │
                            ▼
┌─────────────────────────────────────────────────────────┐
│ After correcting all second pixels in the featuring     │  540
│ region in the first high-frequency image, performing a  │
│ coefficient fusion and a multi-scale reconstruction     │
│ process on the first image and the second image to      │
│ obtain a fusion image without black-and-white edges     │
└─────────────────────────────────────────────────────────┘
```

610
Obtaining a first matrix by performing a high-pass filtering on the first low-frequency image

↓

620
Obtaining a second matrix based on the plurality of first elements and the plurality of second pixels

↓

630
Determining the featuring region based at least in part on the second matrix

Obtaining a fourth matrix based on the first matrix and the first high-frequency image — 710

Obtaining a weight matrix based on the fourth matrix — 720

Correcting the first high-frequency image using the weight matrix — 730

FIG. 7

METHOD AND SYSTEM FOR GENERATING A FUSION IMAGE

CROSS REFERENCE

This application is a continuation of International Application No. PCT/CN2019/110585, filed on Oct. 11, 2019, which claims priority of Chinese Patent Application No. 201811390455.3 filed on Nov. 21, 2018, the entire contents of each of which are hereby incorporated by reference.

TECHNICAL FIELD

The present disclosure generally relates to image processing, and more particularly, relates to method and system for generating a fusion image.

BACKGROUND

As people's monitoring requirements continue to increase, image fusion technology has become one of the hot technologies of video surveillance. In the image fusion methods in the prior art, a visible light image and an infrared image are generally registered first, so that pixel positions of the two images are in one-to-one correspondence, and then a fusion processing is performed. The fusion algorithm usually includes a transform domain algorithm to perform high-low frequency decomposition process on the visible light image and the infrared image respectively, and obtains a fusion image by coefficient fusion and multi-scale reconstruction operations.

The fusion algorithm using the transform domain algorithm may result in a rich and colorful fusion image in a low light environment. However, if there are objects on the scene that have different reflectances from the visible spectrum and the infrared spectrum, there may be black-and-white edges on the edges of these objects in the fusion image, which may result in poor overall image rendering.

Therefore, it is desirable to provide a method and system for generating a fusion image in a more efficient way.

SUMMARY

According to an aspect of the present disclosure, a method for generating a fusion image is provided. The method may be implemented on a device including at least one processor and at least one storage device. The method may include obtaining a first image and a second image of a same scene. Pixels of at least a part of the first image may correspond to pixels of at least a part of the second image. The method may further include generating, based on the first image, a first low-frequency image corresponding to a low-frequency component of the first image. The first low-frequency image may include a plurality of first pixels. The method may further include generating, based on the second image, a first high-frequency image corresponding to a high-frequency component of the second image. The first high-frequency image may include a plurality of second pixels. The plurality of second pixels may correspond to the plurality of first pixels. The method may further include determining, based on the first low-frequency image and the first high-frequency image, a featuring region in the first high-frequency image. The featuring region and a region of the first image that corresponds to the featuring region may have different luminance transition trends. The method may further include correcting the second pixels in the featuring region based at least in part on the first low-frequency image. And the method may also include generating a fusion image based at least in part on the first low-frequency image, and the first high-frequency image.

In some embodiments, the method may further include generating, based on the first image, a second high-frequency image corresponding to a high-frequency component of the first image, and generating, based on the second image, a second low-frequency image corresponding to a low-frequency component of the second image. The fusion image may be generated based further on the second high-frequency image and the second low-frequency image.

In some embodiments, the generating the fusion image may include generating a third low-frequency image by fusing the first low-frequency image and the second low-frequency image, generating a third high-frequency image by fusing the first high-frequency image and the second high-frequency image, and generating the fusion image by combining the third low-frequency image and the third high-frequency image.

In some embodiments, the determining, based on the first low-frequency image and the first high-frequency image, a featuring region in the first high-frequency image may include obtaining a first matrix by performing a high-pass filtering on the first low-frequency image. The first matrix may include a plurality of first elements, and the plurality of first elements may correspond to the plurality of first pixels. The determining, based on the first low-frequency image and the first high-frequency image, a featuring region in the first high-frequency image may further include obtaining a second matrix based on the plurality of first elements and the plurality of second pixels. The second matrix may include a plurality of second elements corresponding to the plurality of second pixels. And each of the plurality of second elements may be based on a sign of the corresponding first element and a sign of the corresponding second pixel. And the determining, based on the first low-frequency image and the first high-frequency image, a featuring region in the first high-frequency image may also include determining the featuring region based at least in part on the second matrix.

In some embodiments, the determining the featuring region based at least in part on the second matrix may include obtaining a third matrix by performing a filtering technique on the second matrix according to the first high-frequency image, and determining the featuring region based at least in part on the third matrix.

In some embodiments, the third matrix may include a plurality of third elements corresponding to the plurality of second pixels. And the determining the featuring region based at least in part on the third matrix may include, for each of the plurality of second pixels, determining whether a pixel value of the second pixel satisfies a first predetermined condition, determining whether a value of the corresponding third element satisfies a second predetermined condition, upon a determination that both the first predetermined condition and the second predetermined condition are satisfied, determining that the second pixel is included in the featuring region, and upon a determination that at least one of the first predetermined condition or the second predetermined condition is not satisfied, determining that the second pixel is not included in the featuring region.

In some embodiments, the correcting pixels in the featuring region based at least in part on the first low-frequency image may include correcting the pixels in the featuring region based at least in part on the first matrix.

In some embodiments, the correcting the pixels in the featuring region based at least in part on the first matrix may include obtaining a fourth matrix based on the first matrix and the first high-frequency image. The fourth matrix may include a plurality of fourth elements corresponding to the plurality of second pixels. And each of the plurality of fourth elements may be based on a ratio of a value of the corresponding first element to a pixel value of the corresponding second pixel. And the correcting the pixels in the featuring region based at least in part on the first matrix may also include correcting the first high-frequency image based on the fourth matrix.

In some embodiments, the correcting the first high-frequency image based on the fourth matrix may include obtaining a weight matrix based on the fourth matrix. The weight matrix may include a first plurality of weights corresponding to the plurality of fourth elements. The first plurality of weights may include a second plurality of weights. The second plurality of weights may correspond to the second pixels in the featuring region. Each of the second plurality of weights may be based on a value range of the fourth elements adjacent to the fourth element that corresponds to the weight. And the correcting the first high-frequency image based on the fourth matrix may further include correcting the first high-frequency image using the weight matrix.

In some embodiments, the first plurality of weights may further include a third plurality of weights. The third plurality of weights may correspond to the second pixels outside the featuring region. And each of the third plurality of weights may be set as 1.

In some embodiments, the correcting the first high-frequency image using the weight matrix may include, for each of the plurality of second pixels, multiplying a current pixel value of the second pixel by a weight of the weight matrix that corresponds to the second pixel.

In some embodiments, the first image and the second image may be obtained via different types of sensors.

According to an aspect of the present disclosure, a system for generating a fusion image is provided. The system may include at least one storage medium including a set of instructions, and at least one processor in communication with the at least one storage medium. When executing the instructions, the at least one processor may be configured to direct the system to perform operations. The operations may include obtaining a first image and a second image of a same scene. Pixels of at least a part of the first image may correspond to pixels of at least a part of the second image. The operations may further include generating, based on the first image, a first low-frequency image corresponding to a low-frequency component of the first image. The first low-frequency image may include a plurality of first pixels. The operations may further include generating, based on the second image, a first high-frequency image corresponding to a high-frequency component of the second image. The first high-frequency image may include a plurality of second pixels. The plurality of second pixels may correspond to the plurality of first pixels. The operations may further include determining, based on the first low-frequency image and the first high-frequency image, a featuring region in the first high-frequency image. The featuring region and a region of the first image that corresponds to the featuring region may have different luminance transition trends. The operations may further include correcting the second pixels in the featuring region based at least in part on the first low-frequency image. And the operations may also include generating a fusion image based at least in part on the first low-frequency image, and the first high-frequency image.

According to an aspect of the present disclosure, a non-transitory computer readable medium is provided. The non-transitory computer readable medium may include at least one set of instructions. When executed by at least one processor, the at least one set of instructions may direct the at least one processor to effectuate a method. The method may include obtaining a first image and a second image of a same scene. Pixels of at least a part of the first image may correspond to pixels of at least a part of the second image. The method may further include generating, based on the first image, a first low-frequency image corresponding to a low-frequency component of the first image. The first low-frequency image may include a plurality of first pixels. The method may further include generating, based on the second image, a first high-frequency image corresponding to a high-frequency component of the second image. The first high-frequency image may include a plurality of second pixels. The plurality of second pixels may correspond to the plurality of first pixels. The method may further include determining, based on the first low-frequency image and the first high-frequency image, a featuring region in the first high-frequency image. The featuring region and a region of the first image that corresponds to the featuring region may have different luminance transition trends. The method may further include correcting the second pixels in the featuring region based at least in part on the first low-frequency image. And the method may also include generating a fusion image based at least in part on the first low-frequency image, and the first high-frequency image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTIONS OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 is a flowchart illustrating an exemplary process for generating a fusion image according to some embodiments of the present disclosure;

FIG. 6 is a flowchart illustrating an exemplary process for determining a featuring region according to some embodiments of the present disclosure;

FIG. 7 is a flowchart illustrating an exemplary process for correcting a first high-frequency image according to some embodiments of the present disclosure;

DETAILED DESCRIPTION

Figure 1:
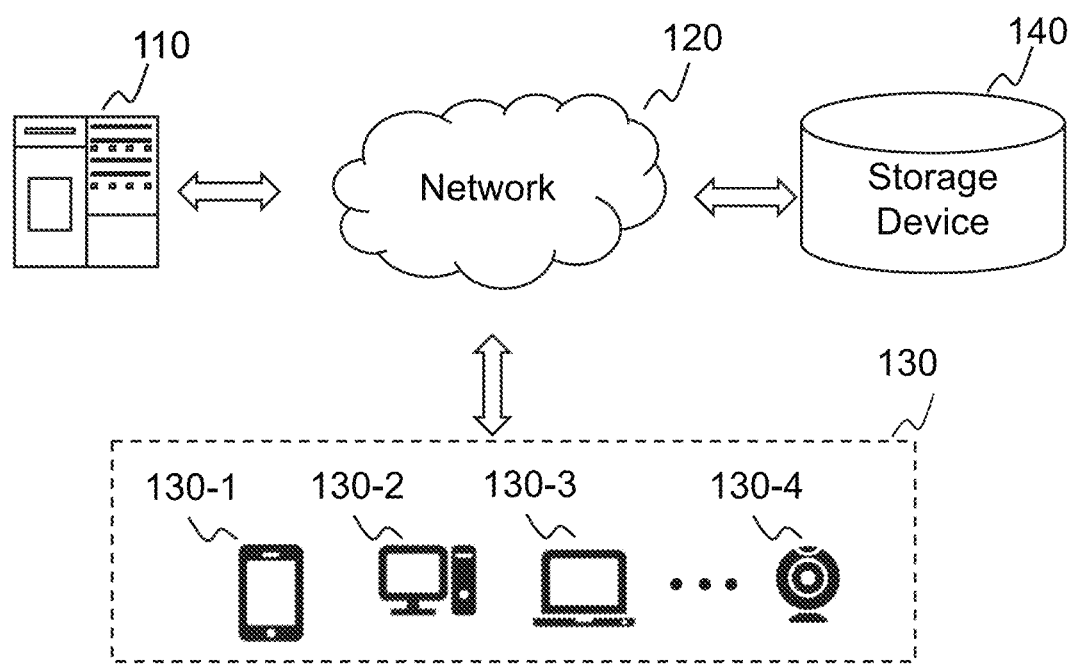
FIG. 1 is a schematic diagram illustrating an exemplary image processing system according to some embodiments of the present disclosure.

The present disclosure technical solution will be described in detail below with reference to the accompanying drawings and specific embodiments. It should be understood that embodiments of the disclosure and specific features in the embodiments are a detailed description of the present disclosure technical solution, rather than a limitation of the present disclosure technical solution. The embodiments of the present disclosure and the technical features in the embodiments may be combined with each other without conflict.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a", "an", and "the" may be intended to include the plural forms as well, unless the context clearly indicates otherwise. It will be further understood that the terms "comprise", "comprises", and/or "comprising", "include", "includes", and/or "including", when used in this specification, specify the presence of stated features, integers, steps, operations, elements, and/or components, but do not preclude the presence or addition of one or more other features, integers, steps, operations, elements, components, and/or groups thereof.

It should be understood that in the description of the embodiments of the present disclosure, terms "first", "second", or the like are used to distinguish descriptions and are not to be construed as indicating or implying a relative importance, nor as an indication or implied order. In the description of the embodiments of the present disclosure, "a plurality of" means two or more.

The term "and/or" in the embodiments of the present disclosure is merely an association describing associated objects, indicating that there may be three relationships. For example, A and/or B may indicate: there are three cases where A exists separately, A and B exist at the same time, and B exists separately. In addition, the character "/" in the present disclosure generally indicates that the contextual object is an "or" relationship.

It will be understood that the term "system," "unit," "module," and/or "block" used herein are one method to distinguish different components, elements, parts, section or assembly of different level in ascending order. However, the terms may be displaced by another expression if they achieve the same purpose.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

With the continuous increasing of people's monitoring requirements, image fusion technology has become one of hot technologies of video monitoring. That is, through a plurality of sensor devices, images of different optical bands may be acquired, and a fusion processing of two or more images may be performed based on the images to obtain a fusion image with rich details and colors. The general steps of fusion processing of two or more images may include one or more following operations. Information of a visible image and information of a non-visible image may be obtained simultaneously. Registration and fusion processes on the information of the two different images may be performed to obtain a fusion image including image features and detailed information of the both images.

For example, in the security field, for low-light scenes at night and haze scenes, more image information may need to be collected to improve the monitoring effect. A near-infrared sensor may obtain near-infrared images with less noise and clear details in nighttime in low-light conditions, and may obtain more detailed fog-transparent images in foggy weather. The near-infrared images and/or the fog-transparent images may be fused with a visible light image obtained by a visible light sensor to obtain a fusion image including colors and details.

In an image fusion method in the prior art, a visible light image may be registered with an infrared image at first, so that pixel positions in the two images may be in one-to-one correspondence. Then a fusion process may be performed. A transform domain algorithm may be used as a fusion algorithm to decompose a visible light image and an infrared image into low-frequency information and high-frequency information. The low-frequency information may reflect an overall contour of the images, and the high-frequency information may reflect image details or noises. Then, according to an acutance value, an information entropy, a gradient value, or the like, low-frequency information of the visible light image and low-frequency information of the infrared image may be fused to obtain a low-frequency image, and high-frequency information of the visible image and high-frequency information of the infrared image may be fused to obtain a high-frequency image. Finally, a fusion image may be obtained by a multi-scale reconstruction operation based on the low-frequency image and the high-frequency image.

Although a fusion image with rich details and colors may be obtained using the transform domain algorithm in a low light environment, if there are objects such as, human bodies, leaves, license plates, or the like in a scene, which may have different reflectances from visible spectra and infrared spectra, a fusion image may have black-and-white edges on edges of the objects.

Objects may have different reflectances for a visible spectrum and an infrared spectrum, which may cause infrared lights and visible lights to have opposite brightness transitions in edge regions of the object. After a visible light image and an infrared image are decomposed, amplitudes and symbols of low-frequency information and high-frequency information of the visible light image may not match with those of the infrared image, which may result in brightness differences of pixels in the edge regions after an image fusion. Then black-and-white edges may be caused in a fusion image, and overall effects of the fused image may be poor.

For the black-and-white edges in the fusion image, the existing solution may be a method to weaken the overall high-frequency information of the visible light image or the overall high-frequency information of the infrared image, thereby weakening the black-and-white edges. However, the method of weakening the overall high-frequency information may only make the black-and-white edges less obvious, and may not really eliminate the black-and-white edges. In addition, if there are objects with a same reflectance in the visible light image and the infrared image, amplitudes and symbols of low-frequency information and high-frequency information of the visible light image may match with those of the infrared image, but because the high-frequency information is weakened, overall definition of the fused image may be degraded, ultimately affecting the image effect.

In view of this, an image processing method for suppressing the black-and-white edges in a fusion image is provided in the present disclosure, so that overall effect of the fused image may be more natural.

FIG. 1 is a schematic diagram illustrating an exemplary image processing system 100 according to some embodiments of the present disclosure. The image processing system 100 may include a processing engine 110, a network 120, one or more terminals 130, and a storage device 140.

The processing engine 110 may process data, images, and/or information obtained from the terminal(s) 130, the storage device 140, an external device, etc. In some embodiments, the processing engine 110 may be a single server or a server group. The server group may be centralized or distributed. In some embodiments, the processing engine 110 may be local or remote. For example, the processing engine 110 may access, via the network 120, data, images, and/or information stored in the terminal(s) 130, the storage device 140, an external device, etc. As another example, the processing engine 110 may be directly connected to the terminal(s) 130, and/or the storage device 140 to access stored data, images, and/or information. In some embodiments, the processing engine 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing engine 110 may be implemented by a computing device having one or more components. In some embodiments, the processing engine 110 may include one or more processing engines (e.g., single-core processing engine(s) or multi-core processor(s)). Merely by way of example, the processing engine 110 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may include any suitable network that can facilitate the exchange of information and/or data for the image processing system 100. In some embodiments, one or more components of the image processing system 100 (e.g., the terminal(s) 130, the processing engine 110, the storage device 140, etc.) may exchange information and/or data with one or more other components of the image processing system 100, or an external device (e.g., an external storage device) via the network 120. For example, the processing engine 110 may obtain image data from the terminal(s) 130 via the network 120. The network 120 may be and/or include a public network (e.g., the Internet), a private network (e.g., a local area network (LAN), a wide area network (WAN))), a wired network (e.g., an Ethernet network), a wireless network (e.g., an 702.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points, through which one or more components of the image processing system 100 may be connected to the network 120 to exchange data and/or information.

The terminal(s) 130 may be configured to take images and/or facilitate the exchange of information and/or data. In some embodiments, the terminal(s) 130 may include a mobile device 131, a tablet computer 132, a laptop computer 133, a monitoring device 130-4, or the like, or any combination thereof. In some embodiments, the mobile device 131 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footwear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof.

In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the monitoring device 130-4 may include a camera, a digital video recorder (DVR), a monitor, a biometric device, or the like, or any combination thereof. For example, the camera may include a dome camera, a board camera, a bullet camera, a box camera, a zoom camera, a water-resistant camera, a infrared camera, or the like, or any combination thereof. The DVR may include a hybrid DVR, a mobile DVR, a network DVR, a portable DVR, or the like, or any combination thereof. The monitor may include a liquid crystal display (LCD) monitor, a cathode ray tube (CRT) monitor, or the like, or any combination thereof. The biometric device may include a facial recognition device, a hand geometry device, an iris recognition device, or the like, or any combination thereof. In some embodiments, the terminal(s) 130 may be part of the processing engine 110.

The storage device 140 may store data, instructions, and/or any other information. In some embodiments, the storage device 140 may store data obtained from the terminal(s) 130 and/or the processing engine 110. In some embodiments, the storage device 140 may store data and/or instructions that the processing engine 110 may execute or use to perform exemplary methods described in the present disclosure. In some embodiments, the storage device 140 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

Figure 2:
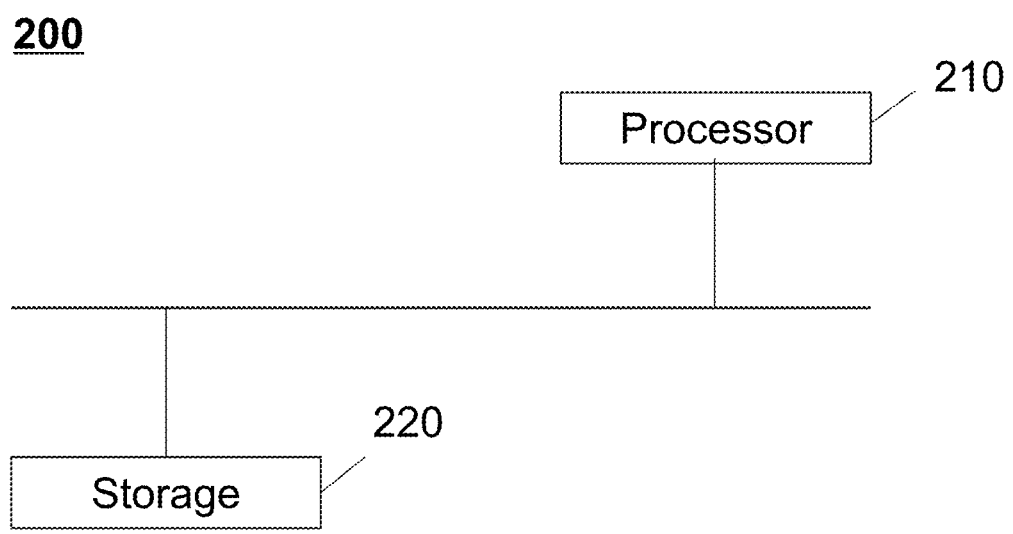
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary processing device 200 according to some embodiments of the present disclosure.

Referring to FIG. 2, the image processing device 200 may include a processor 210 and a storage 220.

The storage 220 may be configured to store computer execution instructions, and cause the image processing device 200 to perform the method described in the embodiments of the present disclosure when the processor 210 executes the instructions.

The processor 210 may execute computer instructions (e.g., program code) and perform functions of the processing engine 110 in accordance with techniques described herein.

The computer instructions may include, for example, routines, programs, objects, components, data structures, procedures, modules, and functions, which perform particular functions described herein. For example, the processor 210 may process image(s) obtained from the terminal(s) 130, the storage device 140, and/or any other component of the image processing system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or a combinations thereof.

Merely for illustration, only one processor is described in the computing device 200. However, it should be noted that the computing device 200 in the present disclosure may also include multiple processors. Thus, operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the terminal(s) 130, the storage device 140, and/or any other component of the image processing system 100, an external device, etc. In some embodiments, the storage 220 may include a mass storage, removable storage, a volatile read-and-write memory, a read-only memory (ROM), or the like, or a combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 110 for processing image.

Figure 3:
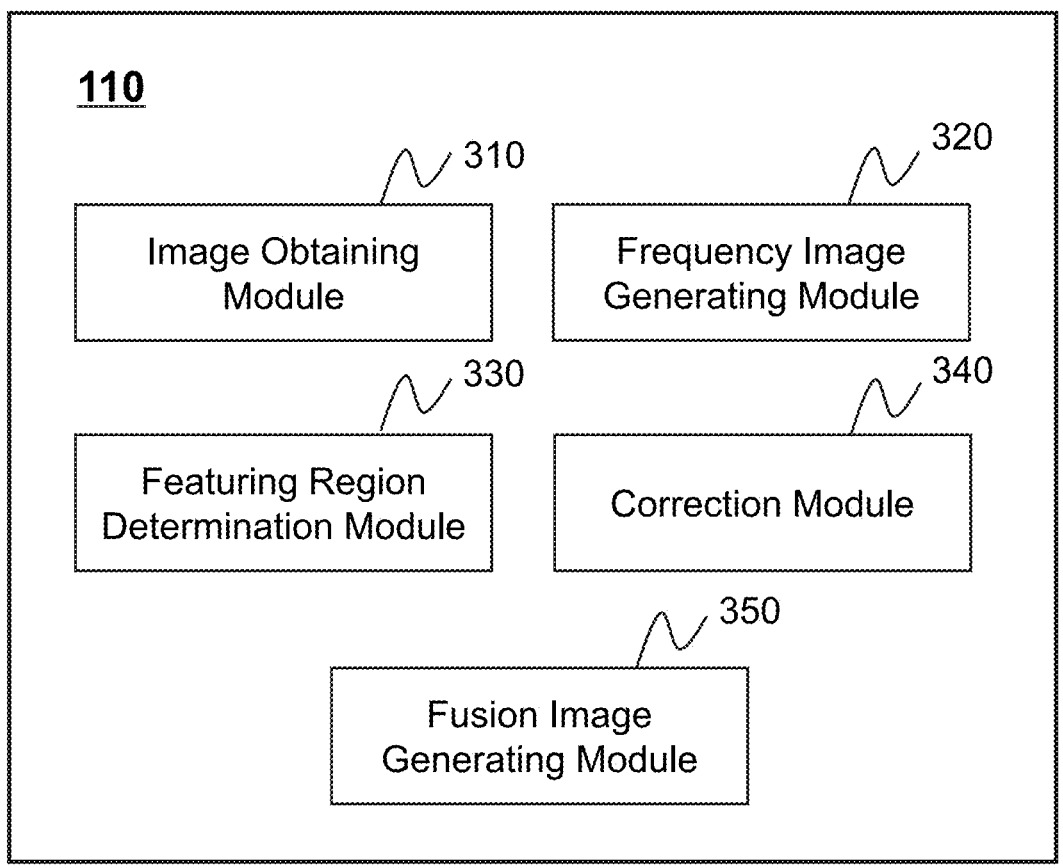
FIG. 3 is a block diagram illustrating an exemplary processing device according to some embodiments of the present disclosure.

FIG. 3 is a block diagram illustrating an exemplary processing device according to some embodiments of the present disclosure. The processing engine 110 may include an image obtaining module 310, a frequency image generating module 320, a featuring region determination module 330, a correction module 340, a fusion image generating module 350. One or more of the modules of the processing engine 110 may be interconnected. The connection(s) may be wireless or wired.

The image obtaining module 310 may be configured to obtain a first image and a second image of a same scene. In some embodiments, the same scene may be a same object (e.g., a person, a landscape, a license plate, etc.) in a same lighting condition. In some embodiments, the image obtaining module 310 may be configured to obtain the first image and the second image of a same scene via the different types of sensors. In some embodiments, the image obtaining module 310 may be configured to perform an image registration process on the first image and the second image, so that the pixels of at least a part of the first image may correspond to pixels of at least a part of the second image.

The frequency image generating module 320 may be configured to generate, based on the first image, a first low-frequency image corresponding to a low-frequency component of the first image. For example, the frequency image generating module 320 may decompose the first image to generate the first low-frequency image corresponding to a low-frequency component of the first image, e.g., the low-frequency information of the first image. In some embodiments, the frequency image generating module 320 may be further configured to generate, based on the second image, a first high-frequency image corresponding to a high-frequency component of the second image. For example, the frequency image generating module 320 may decompose the second image to generate the first high-frequency image corresponding to a high-frequency component of the second image, e.g. the high-frequency information of the second image. In some embodiments, the frequency image generating module 320 may also be configured to generate, based on the first image, a second high-frequency image corresponding to a high-frequency component of the first image. The second high-frequency image may also include a plurality of pixels, and each of the plurality of pixels may correspond to a high-frequency component of a corresponding pixel of the first image. In some embodiments, the frequency image generating module 320 may also be configured to generate, based on the second image, a second low-frequency image corresponding to a low-frequency component of the second image. The second low-frequency image may also include a plurality of pixels, and each of the plurality of pixels may correspond to a low-frequency component of a corresponding pixel of the second image.

The featuring region determination module 330 may be configured to determine, based on the first low-frequency image and the first high-frequency image, a featuring region in the first high-frequency image. In some embodiments, featuring region determination module 330 may be configured to obtain a first matrix by performing a high-pass filtering technique on the first low-frequency image. The first matrix may include a plurality of first elements, and the plurality of first elements may correspond to the plurality of the first pixels. The featuring region determination module 330 may also be configured to obtain a second matrix based on the plurality of first elements and the plurality of second pixels. The second matrix may include a plurality of second elements corresponding to the plurality of second pixels, and each of the plurality of second elements may be based on a sign of the corresponding first element and a sign of the corresponding second pixel. And the featuring region determination module 330 may be further configured to determine the featuring region based at least in part on the second matrix.

In some embodiments, the featuring region determination module 330 may be configured to determine the featuring region directly based on the second matrix. In some embodiments, the featuring region determination module 330 may be further configured to obtain a third matrix by performing a filtering technique on the second matrix according to the first high-frequency image, and determine the featuring region based at least in part on the third matrix. In some embodiments, the third matrix may include a plurality of third elements corresponding to the plurality of second pixels. And for each of the plurality of second pixels, the featuring region determination module 330 may be configured to determine whether a pixel value of the second pixel satisfies a first predetermined condition, and determine whether a value of the corresponding third element satisfies a second predetermined condition. Upon a determination that both the first predetermined condition and the second predetermined condition are satisfied, the featuring region determination module 330 may be configured to determine that the second pixel is included in the featuring region. Upon a determination that at least one of the first predetermined condition or the second predetermined condition is not satisfied, the featuring region determination module 330 may be configured to determine that the second pixel is not included in the featuring region.

The correction module 340 may be configured to correct the second pixels in the featuring region based at least in part on the first low-frequency image. In some embodiments, the correction module 340 may be configured to correct the second pixels in the featuring region based at least in part on the first matrix. For example, the correction module 340 may be configured to obtain a fourth matrix based on the first matrix and the first high-frequency image. The fourth matrix may include a plurality of fourth elements corresponding to the plurality of second pixels, and each of the plurality of fourth elements may be based on a ratio of a value of the corresponding first element to a pixel value of the corresponding second pixel. And the correction module 340 may be further configured to correct the first high-frequency image based on the fourth matrix.

In some embodiments, to correct the first high-frequency image based on the fourth matrix, the correction module 340 may be configured to obtain a weight matrix based on the fourth matrix. The weight matrix may include a first plurality of weights corresponding to the plurality of fourth elements, the first plurality of weights may include a second plurality of weights, the second plurality of weights may correspond to the second pixels in the featuring region, and each of the second plurality of weights may be based on a value range of the fourth elements adjacent to the fourth element that corresponds to the weight. Additionally, the first plurality of weights may further include a third plurality of weights, the third plurality of weights may correspond to the second pixels outside the featuring region, and each of the third plurality of weights is set as 1. Then the correction module 340 may be configured to correct the first high-frequency image using the weight matrix. For example, for each of the plurality of second pixels, the correction module 340 may be configured to multiply a current pixel value of the second pixel by a weight of the weight matrix that corresponds to the second pixel.

The fusion image generating module 350 may be configured to generate a fusion image based at least in part on the first low-frequency image, and the first high-frequency image. In some embodiments, the fusion image generating module 350 may be configured to generate a third low-frequency image by fusing the first low-frequency image and the second low-frequency image. And the fusion image generating module 350 may be further configured to generate a third high-frequency image by fusing the first high-frequency image and the second high-frequency image. Then the fusion image generating module 350 may also be configured to generate the fusion image by combining the third low-frequency image and the third high-frequency image.

It should be noted that the above descriptions of the processing engine 110 are provided for the purposes of illustration, and not intended to limit the scope of the present disclosure. For persons having ordinary skills in the art, various modifications and changes in the forms and details of the application of the above method and system may occur without departing from the principles of the present disclosure. Merely by way of example, the processing engine 110 may include one or more other modules. However, those variations and modifications also fall within the scope of the present disclosure.

Figure 4:
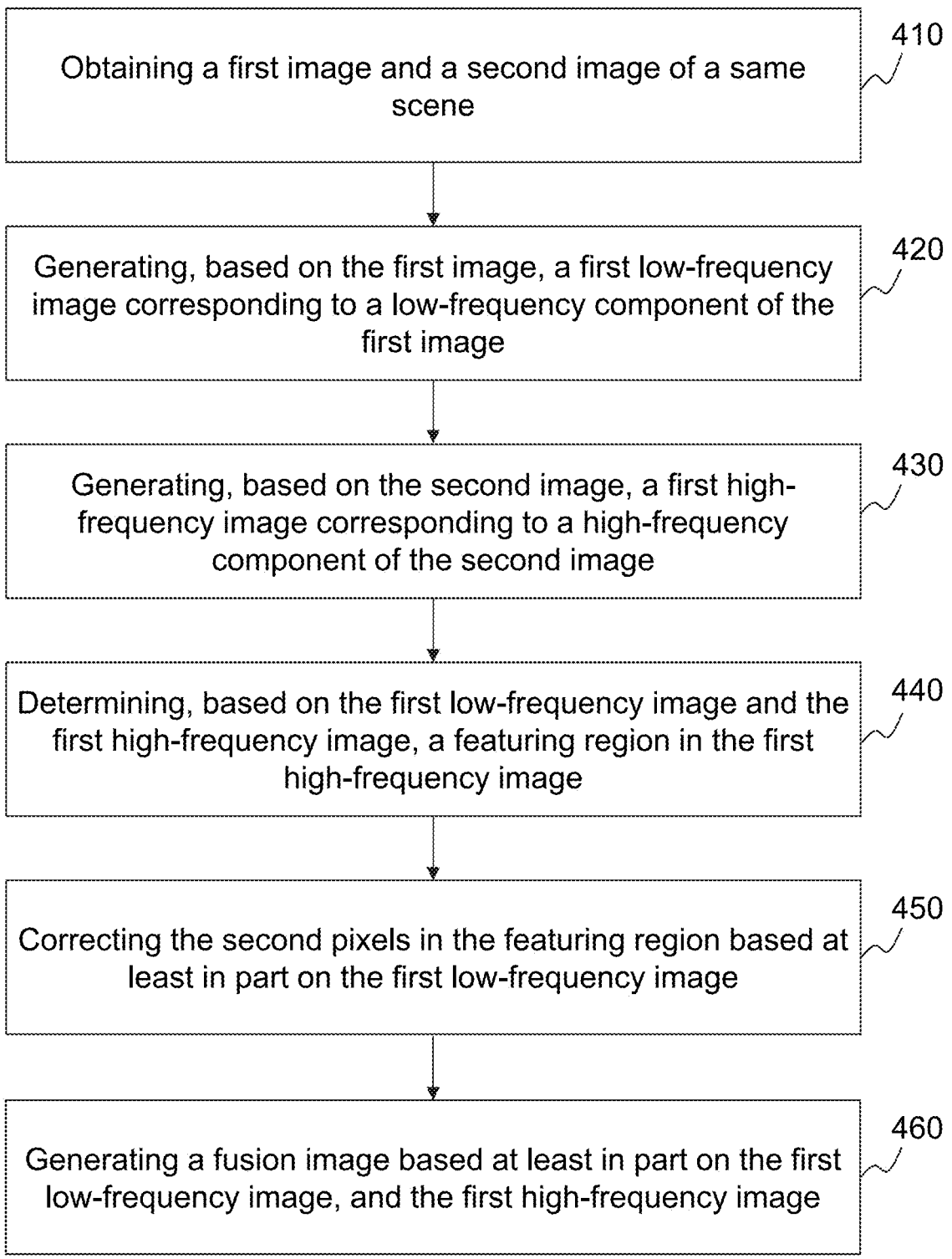
FIG. 4 is a flowchart illustrating an exemplary process for generating a fusion image according to some embodiments of the present disclosure.

FIG. 4 is a flowchart illustrating an exemplary process 400 for generating a fusion image according to some embodiments of the present disclosure. In some embodiments, the process 400 may be executed by the image processing system 100. For example, the process 400 may be implemented as a set of instructions (e.g., an application) stored in one or more storage devices (e.g., the storage device 140, the storage 220) and invoked and/or executed by the processing engine 110 (implemented on, for example, the processor 210 of the processing device 200, and/or the modules illustrated in FIG. 3). The operations of the process 400 presented below are intended to be illustrative. In some embodiments, the process may be accomplished with one or more additional operations not described, and/or without one or more of the operations discussed. Additionally, the order of the operations of the process 400 as illustrated in FIG. 4 and described below is not intended to be limiting.

In 410, the processing engine 110 (e.g., the image obtaining module 310) may obtain a first image and a second image of a same scene. In some embodiments, the same scene may be a same object (e.g., a person, a landscape, a license plate, etc.) in a same lighting condition.

In some embodiments, the first image and the second image may be obtained via different types of sensors. Exemplary sensors may include an infrared sensor, a visible light sensor, a microwave sensor, a magnetic field sensor, a laser sensor, or the like, or any combination thereof. In some embodiments, the processing engine 110 (e.g., the image obtaining module 310) may obtain the first image and the second image of a same scene via the different types of sensors. For example, the first image may be obtained via a visible light sensor. The second image may be obtained via an infrared sensor. In some embodiments, the first image and the second image of the same scene may be in a same size. For example, the height of the first image may be the same as the height of the second image (e.g., having a same number of pixel rows), and the width of the first image may be the same as the width of the second image (e.g., having a same number of pixel columns).

In some embodiments, the first image and the second image may be represented by matrices. For example, for a matrix of the first image, the row of the matrix may correspond to the pixel row of the first image, the column of the matrix may correspond to the pixel column of the first image. Elements of the matrix may correspond to pixels of the first image, and element values of the matrix may correspond to pixel values of the first image. Alternatively or additionally, the first image and the second image may be analyzed and/or processed using matrix theories and matrix algorithms. In some embodiments, since the first image and the second image of the same scene are in the same size, matrices representing the first image and the second image of the same scene may also be in a same size.

In some embodiments, pixels of at least a part of the first image may correspond to pixels of at least a part of the second image. The processing engine 110 (e.g., the image obtaining module 310) may perform an image registration process on the first image and the second image, so that the pixels of at least a part of the first image may correspond to pixels of at least a part of the second image. In some embodiments, pixels of at least a part of the first image may correspond to pixels of at least a part of the second image after the image registration processing. For example, a pixel at a position in the first image may correspond to another pixel at a same position in the second image, and the two pixels may further correspond to one point on an object of a same scene. Alternatively or additionally, elements in a matrix of the at least a part of the first image may correspond to elements in a matrix of the at least a part of the second image.

In 420, the processing engine 110 (e.g., the frequency image generating module 320) may generate, based on the first image, a first low-frequency image corresponding to a low-frequency component of the first image.

In some embodiments, the processing engine 110 (e.g., the frequency image generating module 320) may decompose the first image to generate the first low-frequency image corresponding to a low-frequency component of the first image, e.g., the low-frequency information of the first image. The algorithm used for decomposing the first image may include a pyramid transform algorithm, a wavelet transform algorithm, a bilateral filter algorithm, a guided filter algorithm, or the like, or any combination thereof, which may not be limited in the present disclosure.

In some embodiments, the first low-frequency image may include a plurality of first pixels. And each of the plurality of first pixels may correspond to a low-frequency component of a corresponding pixel of the first image. For example, the low-frequency component may be an infrared low-frequency information. In some embodiments, the first low-frequency image may also be represented as a matrix, and each point in the matrix may correspond to a first pixels of the first low-frequency image.

In 430, the processing engine 110 (e.g., the frequency image generating module 320) may generate, based on the second image, a first high-frequency image corresponding to a high-frequency component of the second image.

In some embodiments, the processing engine 110 (e.g., the frequency image generating module 320) may decompose the second image to generate the first high-frequency image corresponding to a high-frequency component of the second image, e.g. the high-frequency information of the second image. In some embodiments, the algorithm used for decomposing the second image may include a pyramid transform algorithm, a wavelet transform algorithm, a bilateral filter algorithm, a guided filter algorithm, or the like, or any combination thereof, which may not be limited in the present disclosure. Details regarding the decomposition of the first image and/or the second image may be found in FIG. 5 and the description thereof.

In some embodiments, the first high-frequency image may include a plurality of second pixels. And each of the plurality of second pixels may correspond to a high-frequency component of a corresponding pixel of the second image. For example, the high-frequency component may be a visible light high-frequency information. In some embodiments, the plurality of second pixels may correspond to the plurality of first pixels.

In some embodiments, the processing engine 110 (e.g., the frequency image generating module 320) may also generate, based on the first image, a second high-frequency image corresponding to a high-frequency component of the first image. The second high-frequency image may also include a plurality of pixels, and each of the plurality of pixels may correspond to a high-frequency component of a corresponding pixel of the first image. In some embodiments, the processing engine 110 (e.g., the frequency image generating module 320) may also generate, based on the second image, a second low-frequency image corresponding to a low-frequency component of the second image. The second low-frequency image may also include a plurality of pixels, and each of the plurality of pixels may correspond to a low-frequency component of a corresponding pixel of the second image.

In 440, the processing engine 110 (e.g., the featuring region determination module 330) may determine, based on the first low-frequency image and the first high-frequency image, a featuring region in the first high-frequency image.

In some embodiments, the featuring region and a region of the first image that corresponds to the featuring region may have different luminance transition trends.

In some embodiments, the processing engine 110 (e.g., the featuring region determination module 330) may obtain a first matrix by performing a high-pass filtering technique on the first low-frequency image. The first matrix may include a plurality of first elements, and the plurality of first elements may correspond to the plurality of the first 330) may obtain a second matrix based on the plurality of first elements and the plurality of second pixels. The second matrix may include a plurality of second elements corresponding to the plurality of second pixels, and each of the plurality of second elements may be based on a sign of the corresponding first element and a sign of the corresponding second pixel. And the processing engine 110 (e.g., the featuring region determination module 330) may further determine the featuring region based at least in part on the second matrix.

In some embodiments, the processing engine 110 (e.g., the featuring region determination module 330) may determine the featuring region directly based on the second matrix. In some embodiments, the processing engine 110 (e.g., the featuring region determination module 330) may further obtain a third matrix by performing a filtering technique on the second matrix according to the first high-frequency image, and determine the featuring region based at least in part on the third matrix. In some embodiments, the third matrix may include a plurality of third elements corresponding to the plurality of second pixels. And for each of the plurality of second pixels, the processing engine 110 (e.g., the featuring region determination module 330) may determine whether a pixel value of the second pixel satisfies a first predetermined condition, and determine whether a value of the corresponding third element satisfies a second predetermined condition. Upon a determination that both the first predetermined condition and the second predetermined condition are satisfied, the processing engine 110 (e.g., the featuring region determination module 330) may determine that the second pixel is included in the featuring region. Upon a determination that at least one of the first predetermined condition or the second predetermined condition is not satisfied, the processing engine 110 (e.g., the featuring region determination module 330) may determine that the second pixel is not included in the featuring region. Details regarding the determination of the featuring region may be found elsewhere in the present disclosure (e.g., FIG. 6 and the relevant descriptions thereof).

In 450, the processing engine 110 (e.g., the correction module 340) may correct the second pixels in the featuring region based at least in part on the first low-frequency image.

In some embodiments, the processing engine 110 (e.g., the correction module 340) may correct the second pixels in the featuring region based at least in part on the first matrix. For example, the processing engine 110 (e.g., the correction module 340) may obtain a fourth matrix based on the first matrix and the first high-frequency image. The fourth matrix may include a plurality of fourth elements corresponding to the plurality of second pixels, and each of the plurality of fourth elements may be based on a ratio of a value of the corresponding first element to a pixel value of the corresponding second pixel. And the processing engine 110 (e.g., the correction module 340) may further correct the first high-frequency image based on the fourth matrix.

In some embodiments, to correct the first high-frequency image based on the fourth matrix, the processing engine 110 (e.g., the correction module 340) may obtain a weight matrix based on the fourth matrix. The weight matrix may include a first plurality of weights corresponding to the plurality of fourth elements, the first plurality of weights may include a second plurality of weights, the second plurality of weights may correspond to the second pixels in the featuring region, and each of the second plurality of weights may be based on a value range of the fourth elements adjacent to the fourth element that corresponds to the weight. Additionally, the first plurality of weights may further include a third plurality of weights, the third plurality of weights may correspond to the second pixels outside the featuring region, and each of the third plurality of weights is set as 1. Then the processing engine 110 (e.g., the correction module 340) may correct the first high-frequency image using the weight matrix. For example, for each of the plurality of second pixels, the processing engine 110 (e.g., the correction module 340) may multiply a current pixel value of the second pixel by a weight of the weight matrix that corresponds to the second pixel. Details regarding the correction of the pixels may be found elsewhere in the present disclosure (e.g., FIG. 7 and the relevant descriptions thereof).

In 460, the processing engine 110 (e.g., the fusion image generating module 350) may generate a fusion image based at least in part on the first low-frequency image, and the first high-frequency image.

In some embodiments, the processing engine 110 (e.g., the frequency image generating module 320) may also generate a second high-frequency image corresponding to a high-frequency component of the first image, and generate a second low-frequency image corresponding to a low-frequency component of the second image. Then the fusion image may be generated based further on the second high-frequency image and the second low-frequency image.

In some embodiments, the processing engine 110 (e.g., the fusion image generating module 350) may generate a third low-frequency image by fusing the first low-frequency image and the second low-frequency image. And the processing engine 110 (e.g., the fusion image generating module 350) may also generate a third high-frequency image by fusing the first high-frequency image and the second high-frequency image. Then the processing engine 110 (e.g., the fusion image generating module 350) may generate the fusion image by combining the third low-frequency image and the third high-frequency image.

It should be noted that the above description regarding the process 400 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 400 may include one or more additional operations or one or more of the operations mentioned above may be omitted. For example, the operation 420 and 430 may be combined into one step, that is, the processing device may generate the first low-frequency image and the first high-frequency image in one operation. In some embodiments, an operation of the process 400 may be divided into a plurality of sub-operations.

FIG. 5 is a flowchart illustrating an exemplary process 500 for generating a fusion image according to some embodiments of the present disclosure. In some embodiments, the process 500 may be executed by the image processing system 100. For example, the process 500 may be implemented as a set of instructions (e.g., an application) stored in one or more storage devices (e.g., the storage device 140, the storage 220) and invoked and/or executed by the processing engine 110 (implemented on, for example, the processor 210 of the processing device 200, and/or the modules illustrated in FIG. 3). The operations of the process 500 presented below are intended to be illustrative. In some embodiments, the process may be accomplished with one or more additional operations not described, and/or without one or more of the operations discussed. Additionally, the order of the operations of the process 500 as illustrated in FIG. 5 and described below is not intended to be limiting.

In 510, the processing engine 110 (e.g., the frequency image generating module 320) may perform a multi-scale decomposition algorithm on a first image and a second image respectively to obtain multi-scale decomposition results.

In some embodiments, the first image and the second image may be obtained for a same scene via different types of sensors. For example, the same scene may be a same object (e.g., a person, a landscape, a license plate, etc.) in a same lighting condition. And the different types of sensors may include an infrared sensor and a visible light sensor. Then the processing engine 110 (e.g., the image obtaining module 310) may obtain an infrared image via the infrared sensor as a second image and obtain a visible light image of the same object via the visible light sensor as a first image.

As used herein, the multi-scale decomposition, also known as multi-resolution technology, may refer to an algorithm that processes an image at different scales. Specifically, the image may be decomposed using a preset filter, and low frequency data and high frequency data may be obtained. The two sets of data may be down-sampled, and a filtering technique may be performed again (e.g., using the preset filter), thereby proceeding. A result obtained from the filtering technique may be considered as a scale data or a resolution data. The image may be generally processed according to associations of features within a scale or associations among scales, since the image is more easily layered to obtain different image features in different scales.

In some embodiments, the multi-scale decomposition algorithm may include a pyramid transform algorithm, a wavelet transform algorithm, a bilateral filter algorithm, a guided filter algorithm, or the like, which may not be limited in the present disclosure.

Specifically, the performing the multi-scale decomposition algorithm on the first image and the second image respectively may include one or more of the following operations. The processing engine 110 (e.g., the frequency image generating module 320) may perform a multi-scale decomposition algorithm on the visible light image to obtain visible light high-frequency information and visible light low-frequency information. Furthermore, the processing engine 110 (e.g., the frequency image generating module 320) may perform another multi-scale decomposition algorithm on an infrared image to obtain infrared high-frequency information and infrared low-frequency information. The multi-scale decomposition algorithm(s) performed by the processing engine 110 may be the same, or different. Correspondingly, the multi-scale decomposition results may include the visible light high-frequency information, the visible light low-frequency information, the infrared high-frequency information, and the infrared low-frequency information.

Correspondingly, the visible light low-frequency information may correspond to the first low-frequency image, the visible light high-frequency information may correspond to the second high-frequency image, the infrared high-frequency information may correspond to the first high-frequency image, and infrared low-frequency information may correspond to the second low-frequency image. Optionally, all the images may be represented by matrices.

In some embodiments, the processing engine 110 (e.g., the image obtaining module 310) may perform an image registration process on the first image and the second image, so that the pixels of at least a part of the first image may correspond to pixels of at least a part of the second image. For example, the processing engine 110 (e.g., the image obtaining module 310) may perform an image registration process on the first image using image registration algorithms such as an image matching algorithm based on grayscales, an image matching algorithm based on features (e.g., based on points, edges, regions, etc.), an image matching algorithm based on transform domains, or the like, or any combination thereof. Exemplary image matching algorithm based on grayscales may include a mean absolute difference algorithm, a sum of absolute differences algorithm, a sum of squared differences algorithm, a mean square differences algorithm, a normalized cross correlation algorithm, or the like. Exemplary image matching algorithm based on transform domains may include a Fourier-Mellin transform algorithm, a Walsh transform algorithm, a wavelet transform algorithm, or the like.

Supposing that the first image is a visible light image and the second image is an infrared image, before performing a multi-scale decomposition algorithm on the visible light image, the visible light image may need to be registered with the infrared image to make pixel positions of the visible light image and pixel positions of the infrared image in one-to-one correspondence. The operations utilized in the registration process may include correcting pixel positions of the infrared image to match pixel positions of the visible light image, or correcting pixel positions of the visible light image to match pixel positions of the infrared image, which may not be limited in the present disclosure. In some embodiments, the operations may be performed during a calibration process of the devices (e.g., the visible light sensor and/or the infrared sensor) when the device is being assembled, or may be performed during an off-line calibration process, which may not be limited in the present disclosure.

In step 520, for each pixel (e.g., each second pixel in the first high-frequency image), the processing engine 110 (e.g., the featuring region determination module 330) may determine whether the second pixel is in a featuring region according to the multi-scale decomposition results.

In some embodiments, the featuring region and a region of the first image that corresponds to the featuring region may have different luminance transition trends. For example, the luminance transition trend of the featuring region may be opposite to the luminance transition trend of the region of the first image that corresponds to the featuring region. As used herein, the region of the first image that corresponds to the featuring region may include a region of the first image except the featuring region. For example, the region of the first image that corresponds to the featuring region may be adjacent to the featuring region.

In some embodiments, the featuring region may refer to an image region in which an amplitude and a sign (e.g., a plus sign and/or a minus sign) of a first pixel in the first high-frequency image do not match those of a corresponding second pixel in the second high-frequency image. In some embodiments, the featuring region may refer to a region where the black-and-white edges may occur after an image fusion operation on the first image and the second image.

In some embodiments, the processing engine 110 (e.g., the featuring region determination module 330) may determine whether the second pixel is in the featuring region according to a high-pass filtering result of the first low-frequency image corresponding to the second pixel.

In some embodiments, the processing engine 110 (e.g., the featuring region determination module 330) may obtain a first matrix by performing a high-pass filtering technique on the first low-frequency image. The first matrix may include a plurality of first elements, and the plurality of first elements may correspond to the plurality of the first 330) may obtain a second matrix based on the plurality of first elements and the plurality of second pixels. The second matrix may include a plurality of second elements corresponding to the plurality of second pixels, and each of the plurality of second elements may be based on a sign of the corresponding first element and a sign of the corresponding second pixel. In some embodiments, the processing engine 110 (e.g., the featuring region determination module 330) may further determine the featuring region based at least in part on the second matrix.

For example, supposing that the first low-frequency image is an visible light low-frequency image, for each of the plurality of second pixels, from top to bottom, from left to right, combined with the high-pass filtering result of the visible light low-frequency image, the processing engine 110 (e.g., the featuring region determination module 330) may check each of the plurality of second pixels one by one to determine whether the each of the plurality of second pixels is in the black-and-white edges.

Specifically, the processing engine 110 (e.g., the featuring region determination module 330) may obtain a first matrix (e.g., the high-pass filtering result) by performing a high-pass filtering technique on the visible light low-frequency image. Further, the processing engine 110 may obtain a second matrix based on a plurality of first elements of the first matrix and a plurality of second pixels in an infrared high-frequency image. Then, the processing engine 110 (e.g., the featuring region determination module 330) may determine a second pixel is in a featuring region if a second element value in the second matrix corresponding to the second pixel satisfies a condition.

As another example, the black-and-white edges reflected by the second matrix may be more susceptible to noise interferences in the visible light image. Therefore, when the high-pass filter results of the visible light low frequency image corresponding to a certain pixel satisfies the condition, the processing engine 110 (e.g., the featuring region determination module 330) may further accurately determine whether the pixel is in the featuring region according to neighborhood information of the pixel.

Specifically, the processing engine 110 (e.g., the featuring region determination module 330) may delimit a window with a first preset size centering on the pixel, and perform a guided filter process on the second elements corresponding to all pixels in the window according to the infrared high-frequency image n_hign corresponding to all the pixels in the window to obtain a guided filter result lp, wherein, r is the radius of the window. For a pixel, when lp satisfies lp<−s1||lp>s2 and n_hign satisfies abs(n_high)>s3, the processing engine 110 (e.g., the featuring region determination module 330) may determine that the pixel is in the featuring region, otherwise the processing engine 110 (e.g., the featuring region determination module 330) may determine that the pixel is not in the featuring region. Wherein II represents a logical OR operator, abs(x) represents an absolute value operation, s1, s2 and s3 are preset parameters.

Details regarding the determination of the featuring region may be found in FIG. 6 and the description thereof.

In some embodiments, if the processing engine 110 (e.g., the featuring region determination module 330) determine that the pixel is in the featuring region, step 530 may be executed.

In step 530, the processing engine 110 (e.g., the correction module 340) may correct the second pixels in the first high-frequency image according to the multi-scale decomposition results, to make the amplitude and the sign of the second pixel in the first high-frequency image match those in the second high-frequency image respectively.

In some embodiments, the processing engine 110 (e.g., the correction module 340) may correct the second pixels in the featuring region based at least in part on the first matrix. For example, the processing engine 110 (e.g., the correction module 340) may obtain a fourth matrix based on the first matrix and the first high-frequency image. The fourth matrix may include a plurality of fourth elements corresponding to the plurality of second pixels, and each of the plurality of fourth elements may be based on a ratio of a value of the corresponding first element to a pixel value of the corresponding second pixel. And the processing engine 110 (e.g., the correction module 340) may further correct the first high-frequency image based on the fourth matrix.

In some embodiments, to correct the first high-frequency image based on the fourth matrix, the processing engine 110 (e.g., the correction module 340) may obtain a weight matrix based on the fourth matrix. The weight matrix may include a first plurality of weights corresponding to the plurality of fourth elements, the first plurality of weights may include a second plurality of weights, the second plurality of weights may correspond to the second pixels in the featuring region, and each of the second plurality of weights may be based on a value range of the fourth elements adjacent to the fourth element that corresponds to the weight. Additionally, the first plurality of weights may further include a third plurality of weights, the third plurality of weights may correspond to the second pixels outside the featuring region, and each of the third plurality of weights is set as 1. Then the processing engine 110 (e.g., the correction module 340) may correct the first high-frequency image using the weight matrix. For example, for each of the plurality of second pixels, the processing engine 110 (e.g., the correction module 340) may multiply a current pixel value of the second pixel by a weight of the weight matrix that corresponds to the second pixel. Details regarding the correction of the pixels may be found elsewhere in the present disclosure (e.g., FIG. 7 and the relevant descriptions thereof).

In step 540, after correcting all second pixels in the featuring region in the first high-frequency image, the processing engine 110 (e.g., the fusion image generating module 350) may obtain a fusion image without black-and-white edges based on the first image and the corrected second image.

In some embodiments, the processing engine 110 (e.g., the frequency image generating module 320) may also generate a second high-frequency image corresponding to a high-frequency component of the first image, and generate a second low-frequency image corresponding to a low-frequency component of the second image. Then the fusion image may be generated based further on the second high-frequency image and the second low-frequency image.

In some embodiments, the processing engine 110 (e.g., the fusion image generating module 350) may generate a third low-frequency image by fusing the first low-frequency image and the second low-frequency image. And the processing engine 110 (e.g., the fusion image generating module 350) may also generate a third high-frequency image by fusing the first high-frequency image and the second high-frequency image. Then the processing engine 110 (e.g., the fusion image generating module 350) may generate the fusion image by combining the third low-frequency image and the third high-frequency image.

For example, after correcting the infrared high-frequency information corresponding to all pixels in the featuring region, the processing engine 110 (e.g., the fusion image generating module 350) may perform a coefficient fusion process and a multi-scale reconstruction operation on the infrared image and the visible light image to obtain a fusion image without black-and-white edges.

In some embodiments, the specific implementation of the coefficient fusion operation may include a simple weighted average, or the processing engine 110 (e.g., the fusion image generating module 350) may generate a weight map for weighting by using information such as an entropy, a gradient, an acutance, a SNR (Signal to Noise Ratio), or the like of the image, which may not be limited in the present disclosure.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 500 may include one or more additional operations or one or more of the operations mentioned above may be omitted. In some embodiments, an operation of the process 500 may be divided into a plurality of sub-operations. For example, the operation 540 may be divided into operation 540-1 and 540-2, in operation 540-1, the processing engine 110 (e.g., the fusion image generating module 350) may perform a coefficient fusion process on the infrared image and the visible light image, and in operation 540-2, the processing engine 110 (e.g., the fusion image generating module 350) may perform a multi-scale reconstruction operation on the infrared image and the visible light image after the coefficient fusion process to obtain a fusion image without black-and-white edges.

FIG. 6 is a flowchart illustrating an exemplary process 600 for determining a featuring region according to some embodiments of the present disclosure. In some embodiments, the process 600 may be executed by the image processing system 100. For example, the process 600 may be implemented as a set of instructions (e.g., an application) stored in one or more storage devices (e.g., the storage device 140, the storage 220) and invoked and/or executed by the processing engine 110 (implemented on, for example, the processor 210 of the processing device 200, and/or the modules illustrated in FIG. 3). The operations of the process 600 presented below are intended to be illustrative. In some embodiments, the process 600 may be accomplished with one or more additional operations not described, and/or without one or more of the operations discussed. Additionally, the order of the operations of the process 600 as illustrated in FIG. 6 and described below is not intended to be limiting. In some embodiments, one or more operations of the process 600 may be performed to achieve operation 440 and/or operation 520.

In 610, the processing engine 110 (e.g., the featuring region determination module 330) may obtain a first matrix by performing a high-pass filtering technique on the first low-frequency image.

In some embodiments, the processing engine 110 (e.g., the featuring region determination module 330) may perform a high-pass filtering technique on the first low-frequency image according to following Equation (1):

$$vp = v\_low * \text{high\_kernel} \qquad (1),$$

wherein vp denotes a high-pass filtering result (e.g., the first matrix) of the first low-frequency image, v_low denotes the first low-frequency image, * indicates a convolution operation, high_kernel denotes a high-pass filtering core. Exemplary kernel may include $$\begin{bmatrix} 0 & 1 & 0 \\ 1 & -4 & 1 \\ 0 & 1 & 0 \end{bmatrix}, \begin{bmatrix} 1 & 1 & 1 \\ 1 & -8 & 1 \\ 1 & 1 & 1 \end{bmatrix}, \begin{bmatrix} 0 & -1 & 0 \\ -1 & -4 & -1 \\ 0 & -1 & 0 \end{bmatrix}, \begin{bmatrix} 1 & -1 & 1 \\ -1 & 8 & -1 \\ 1 & -1 & 1 \end{bmatrix},$$

or the like.

Supposing that the first low-frequency image is an visible light low-frequency image, for each of the plurality of second pixels, from top to bottom, from left to right, combined with the high-pass filtering result of the visible light low-frequency image, the processing engine 110 (e.g., the featuring region determination module 330) may check each of the plurality of second pixels one by one to determine whether the each of the plurality of second pixels is in the black-and-white edges.

In some embodiments, the first matrix may include a plurality of first elements, and the plurality of first elements may correspond to the plurality of first pixels. For example, supposing that the first low-frequency image is a 3×3 matrix including 9 elements corresponding to 9 first pixels. Hence, the first matrix obtained from the high-pass filtering of the first low-frequency image may also be a 3×3 matrix including 9 first elements, and the 9 first elements may also correspond to the 9 first pixels.

In 620, the processing engine 110 (e.g., the featuring region determination module 330) may obtain a second matrix based on the plurality of first elements and the plurality of second pixels.

In some embodiments, the second matrix may include a plurality of second elements corresponding to the plurality of second pixels. For example, supposing that the first matrix is a 3×3 matrix including 9 first elements, the first high-frequency image is a 3×3 matrix including 9 second pixels. Hence, the second matrix obtained by multiplying a 3×3 matrix (e.g., the first matrix) by a 3×3 matrix (e.g., the first high-frequency image) may also be a 3×3 matrix including 9 second elements, and the 9 second elements may correspond to the 9 second pixels.

In some embodiments, each of the plurality of second elements may be based on a sign of the corresponding first element and a sign of the corresponding second pixel. The sign may include a plus sign and/or a minus sign. In some embodiments, during a determination process of the second matrix, each first elements and each second pixel may first be assigned with a sign. And, the second matrix may be obtained based on the processed first elements and the processed second pixels. Merely by way of an example, the processing engine 110 (e.g., the featuring region determination module 330) may obtain the second matrix according to following Equation (2):

$$p\_sign = \text{sign}(vp) \cdot \text{sign}(n\_high) \cdot 256 \qquad (2)$$

wherein p_sign denotes the second matrix, vp denotes the first matrix, n_high denotes the first high-frequency image. The sign(x) may denote a sign assigning algorithm, and may be expressed according to following Equation (3):

$$\text{sign}(x) = \begin{cases} 1 & x > 0 \\ 0 & x = 0 \\ -1 & x < 0 \end{cases} \qquad (3)$$

According to the Equation (3) and Equation (2), a value of the second element included in p_sign may be 0, −256, or 256.

In 630, the processing engine 110 (e.g., the featuring region determination module 330) may determine the featuring region based at least in part on the second matrix.

In some embodiments, the processing engine 110 (e.g., the featuring region determination module 330) may determine the featuring region directly based on the second matrix.

For example, if the value of the second element in the second matrix is −256, the processing engine 110 (e.g., the featuring region determination module 330) may determine that the second pixel corresponding to the second element is included in the featuring region. Otherwise (e.g., the value of the second element in the second matrix is 256 or 0), the second pixel is not included in the featuring region.

In some embodiments, the featuring region (e.g., the black-and-white edges) reflected by the second matrix may be more susceptible to noise interferences in the visible light image. Therefore, after determining that a second pixel is included in the featuring region based on the second matrix, the processing engine 110 (e.g., the featuring region determination module 330) may further accurately determine whether the second pixel is in the featuring region according to neighborhood information corresponding to the second pixel.

In some embodiments, the neighborhood information may include information of the second matrix in a first region and information of the first high-frequency image in the first region. The first region may be a window with a preset size centering on a second element and/or a second pixel. For example, for a second element in the second matrix, the processing engine 110 (e.g., the featuring region determination module 330) may determine a window centering on the second element. And the processing engine 110 (e.g., the featuring region determination module 330) may further determine a window with a same size centering on a second pixel corresponding to the second element in the first high-frequency image. Therefore, the neighborhood information corresponding to the second pixel may include information about the second elements in the window in the second matrix, and information about the second pixels in the window of the first high-frequency image.

In some embodiments, the processing engine 110 (e.g., the featuring region determination module 330) may obtain a third matrix by performing a filtering technique on the second matrix according to the first high-frequency image. The third matrix may include a plurality of third elements corresponding to the plurality of second pixels. For example, the processing engine 110 (e.g., the featuring region determination module 330) may perform a filtering technique on a second element according to the neighborhood information to obtain a third element, and then obtain the third matrix. In some embodiments, the filtering technique may include a guided filtering, a joint bilateral filtering, or the like, or any combination thereof.

In some embodiments, the processing engine 110 (e.g., the featuring region determination module 330) may perform a filtering technique on the second matrix by sliding a window on the second matrix. Taking the guided filtering as an example, supposing that p_sign is data p to be filtered, and n_high is guiding data I. Starting from the upper left corner of the second matrix and the first high-frequency image, from left to right, from top to bottom, with a window having a size (2r+1)×(2r+1), the processing engine 110 (e.g., the featuring region determination module 330) may slide the window to perform calculations on each of the plurality of second elements determined to be in the featuring region directly based on the second matrix.

Merely by way of an example, the processing engine 110 (e.g., the featuring region determination module 330) may perform the calculations according to following Equation (4)-Equation (14):

$$\text{mean\_I} = \frac{\sum_{-r}^{r} I}{(2r+1) \times (2r+1)} \qquad (4)$$

wherein mean_I represents an average value of the data I in the neighborhood window of a current second element, the current second element may corresponding to a second pixel included in the featuring region.

$$\text{mean\_p} = \frac{\sum_{-r}^{r} p}{(2r+1) \times (2r+1)} \qquad (5)$$

wherein mean_p represents an average value of the data p in the neighborhood window of the current second element.

$$\text{corr\_I} = \frac{\sum_{-r}^{r} (I \times I)}{(2r+1) \times (2r+1)} \qquad (6)$$

wherein corr_I represents an average value of a product of the data I and the data I in the neighborhood window of the current second element.

$$\text{corr\_Ip} = \frac{\sum_{-r}^{r} (I \times p)}{(2r+1) \times (2r+1)} \qquad (7)$$

wherein corr_Ip represents an average value of a product of the data I and the data p in the neighborhood window of the current second element.

$$\text{var\_I} = \text{corr\_I} - \text{mean\_I} \times \text{mean\_I} \qquad (8)$$

wherein var_I represents a region variance of the data I of the current second element.

$$\text{cov\_Ip} = \text{corr\_Ip} - \text{mean\_I} \times \text{mean\_p} \qquad (9)$$

wherein cov_Ip represents a region covariance of the data I and the data p of the current second element.

$$a = \frac{\text{cov\_Ip}}{\text{var\_I}} \qquad (10)$$

$$b = \text{mean\_p} - a \times \text{mean\_I} \qquad (11)$$

wherein a and b represent coefficients of linear functions used when the processing engine 110 (e.g., the featuring region determination module 330) performs a guided filtering technique on the current second element. The a of the entire second elements may constitute data a, and the b of the entire second elements may constitute data b.

After obtaining the a and b of the entire second elements, starting again from the upper left corner of the second matrix and the first high-frequency image, from left to right, from top to bottom, with a window having a size (2r+1)×(2r+1), the processing engine 110 (e.g., the featuring region determination module 330) may slowly slide the window to perform calculations according to following Equation (12)-Equation (14):

$$\text{mean\_a} = \frac{\sum_{-r}^{r} a}{(2r+1) \times (2r+1)}, \qquad (12)$$

wherein mean_a represents an average value of the data a in the neighborhood window of the current second element.

$$\text{mean\_b} = \frac{\sum_{-r}^{r} b}{(2r+1) \times (2r+1)}, \qquad (13)$$

wherein mean_b represents an average value of the data b in the neighborhood window of the current second element.

$$\text{Ip} = \text{mean\_a} \times I + \text{mean\_b} \qquad (14),$$

wherein Ip (e.g., the third matrix) denotes the guided filtering result of p_sign, and the symbol $$\sum_{-r}^{r}$$

in the equations above represent a sum of all data in the window.

In some embodiments, the processing engine 110 (e.g., the featuring region determination module 330) may determine the featuring region based at least in part on the third matrix.

In some embodiments, for each of the plurality of second pixels, the processing engine 110 (e.g., the featuring region determination module 330) may determine whether a pixel value of the second pixel satisfies a first predetermined condition. For example, the first predetermined condition may include abs(n_hign)>s3, wherein abs(x) denotes an absolute value operation, s3 is a preset system parameter.

In some embodiments, for each of the plurality of second pixels, the processing engine 110 (e.g., the featuring region determination module 330) may further determine whether a value of the corresponding third element satisfies a second predetermined condition. For example, the second predetermined condition may include lp<s1||lp> s2, wherein || is a logical OR operator, s1 and s2 are preset system parameters.

In some embodiments, upon a determination that both the first predetermined condition and the second predetermined condition are satisfied, the processing engine 110 (e.g., the featuring region determination module 330) may determine that the second pixel is included in the featuring region. For example, if the pixel value of the second pixel satisfies the abs(n_hign)>s3, and at the same time the value of the corresponding third element satisfies the lp<s1||lp>s2, the second pixel may be determined to be included in the featuring region.

In some embodiments, upon a determination that at least one of the first predetermined condition or the second predetermined condition is not satisfied, the processing engine 110 (e.g., the featuring region determination module 330) may determine that the second pixel is not included in the featuring region. For example, if the pixel value of the second pixel does not satisfy the abs(n_hign)>s3, and/or the value of the corresponding third element does not satisfy the lp<s1||lp>s2, the second pixel may be determined to be not included in the featuring region.

In some embodiments, those skilled in the art may select to determine the featuring region directly based on the second matrix, or may select to determine the featuring region based at least in part on the third matrix. When a second pixel is initially determined in the featuring region directly based on the second matrix, the second pixel may be considered to be in the featuring region, and an accurate determination process based at least in part on the third matrix may not be performed.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 600 may include one or more additional operations or one or more of the operations mentioned above may be omitted. In some embodiments, an operation of the process 600 may be divided into a plurality of sub-operations. For example, the operation 630 may be divided into a sub-operation 630-1 and a sub-operation 630-2. In the sub-operation 630-1, the processing engine 110 may determine the featuring region directly based on the second matrix, and in the sub-operation 630-2, the processing engine 110 may determine the featuring region based at least in part on the third matrix. Alternatively or additionally, the sub-operation 630-2 may be omitted.

FIG. 7 is a flowchart illustrating an exemplary process 700 for correcting a first high-frequency image according to some embodiments of the present disclosure. In some embodiments, the process 700 may be executed by the image processing system 100. For example, the process 700 may be implemented as a set of instructions (e.g., an application) stored in one or more storage devices (e.g., the storage device 140, the storage 220) and invoked and/or executed by the processing engine 110 (implemented on, for example, the processor 210 of the computing device 200, and/or the modules illustrated in FIG. 3). The operations of the process 700 presented below are intended to be illustrative. In some embodiments, the process may be accomplished with one or more additional operations not described, and/or without one or more of the operations discussed. Additionally, the order of the operations of the process 700 as illustrated in FIG. 7 and described below is not intended to be limiting. In some embodiments, one or more operations of the process 700 may be performed to achieve operation 450 and/or operation 530.

In 710, the processing engine 110 (e.g., the correction module 340) may obtain a fourth matrix based on the first matrix and the first high-frequency image.

In some embodiments, the fourth matrix may include a plurality of fourth elements corresponding to the plurality of second pixels, and each of the plurality of fourth elements may be based on a ratio of a value of the corresponding first element to a pixel value of the corresponding second pixel.

In some embodiments, to obtain the fourth matrix, the processing engine 110 (e.g., the correction module 340) may determine a ratio relationship between the high-pass filtering result (e.g., the first matrix) and the first high-frequency image corresponding according to following Equation (15):

$$w = -\frac{vp}{n\_high} \tag{15}$$

wherein w is the fourth matrix, the w includes a plurality of fourth elements corresponding to the plurality of second pixels, and each of the plurality of fourth elements is based on a ratio of a value of the corresponding first element to a pixel value of the corresponding second pixel.

In 720, the processing engine 110 (e.g., the correction module 340) may obtain a weight matrix based on the fourth matrix.

In some embodiments, the weight matrix may include a first plurality of weights corresponding to the plurality of fourth elements. For example, the fourth matrix may include 9 fourth elements, and the weight matrix may include 9 weights corresponding to the 9 fourth elements.

In some embodiments, the first plurality of weights may include a second plurality of weights, and the second plurality of weights may correspond to the second pixels in the featuring region. In some embodiments, each of the second plurality of weights may be based on a value range of the fourth elements adjacent to the fourth element that corresponds to the weight. In some embodiments, in the fourth matrix, the processing engine 110 (e.g., the correction module 340) may determine a second region centering on a fourth element corresponding to a second pixel in the featuring region, the fourth elements adjacent to the fourth element may be fourth elements in the second region.

For example, to obtain the weight matrix, for each fourth elements corresponding to a second pixel included in the featuring region, the processing engine 110 (e.g., the correction module 340) may determine a pre-sized window centering on the fourth element in the w matrix (e.g., the fourth matrix), and determine a maximum value w_max and a minimum value w_min of all the values of the other fourth elements in the window. And the processing engine 110 (e.g., the correction module 340) may further determine a value of the second plurality of weight w according to the following Equation (16):

$$w' = \begin{cases} w\_max & w \geq w\_max \\ w & w\_min < w < w\_max \\ w\_min & w \leq w\_min \end{cases} \quad (16)$$

wherein w_max represents a maximum value of all the fourth elements in the pre-sized window except the central fourth element, w_min represents a minimum value of all the fourth elements in the pre-sized window except the central fourth element, and w represents a value of the central fourth element in the pre-sized window.

In some embodiments, the first plurality of weights may further include a third plurality of weights, and the third plurality of weights may correspond to the second pixels outside the featuring region. In some embodiments, each of the third plurality of weights is set as 1. That is, values of the second pixels outside the featuring region may not be corrected in the present disclosure.

In 730, the processing engine 110 (e.g., the correction module 340) may correct the first high-frequency image using the weight matrix. In some embodiments, for each of the plurality of second pixels, the processing engine 110 (e.g., the correction module 340) may multiply a current pixel value of the second pixel by a weight of the weight matrix that corresponds to the second pixel. For example, the processing engine 110 (e.g., the correction module 340) may correct the first high-frequency image according to following Equation (17):

$$n\_high' = w'' \times n\_high \quad (17)$$

wherein n_high' denotes a corrected first high-frequency image, w" denotes the weight matrix.

It should be noted that the above description regarding the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 700 may include one or more additional operations or one or more of the operations mentioned above may be omitted. In some embodiments, an operation of the process 700 may be divided into a plurality of sub-operations.

Figure 8:
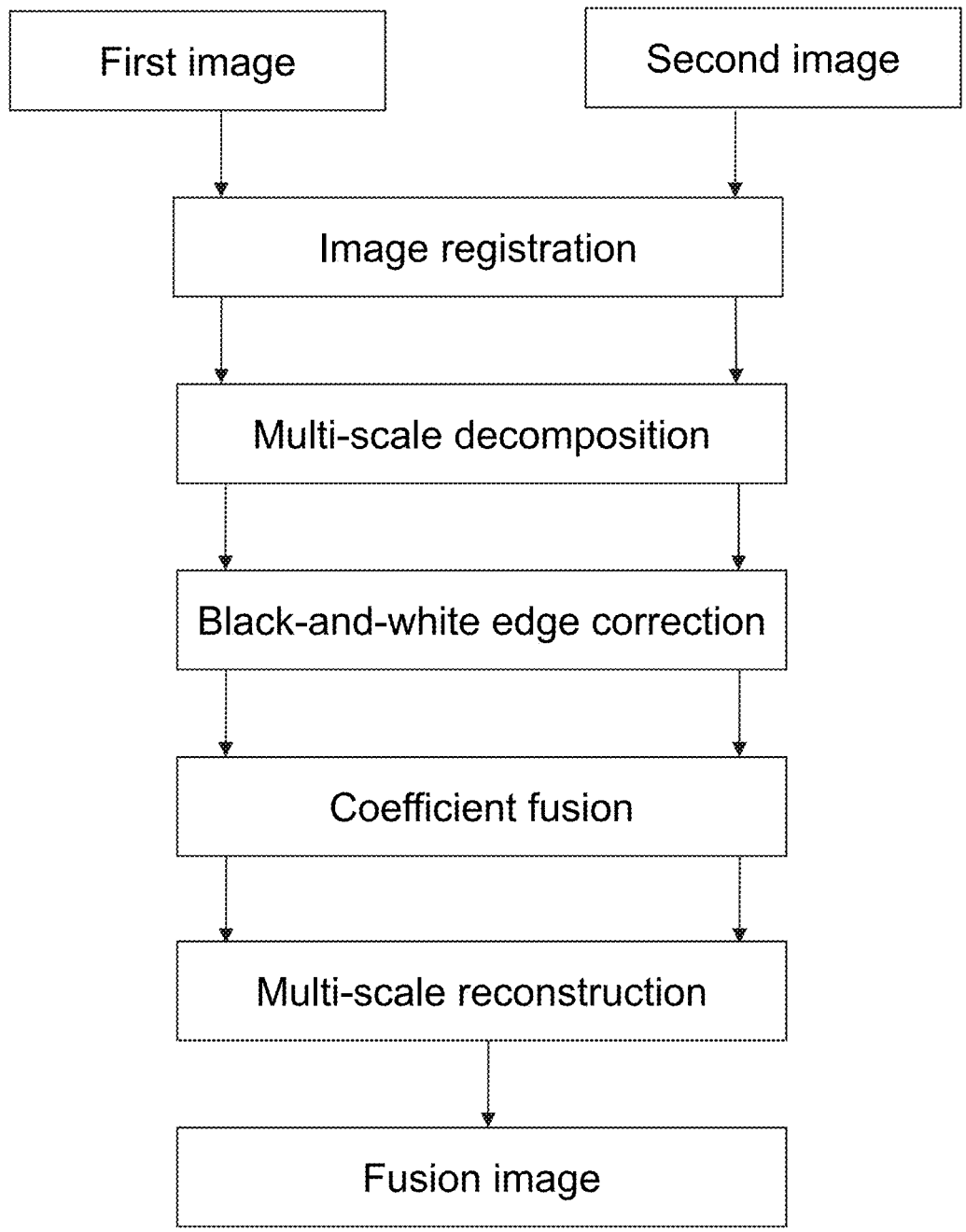
FIG. 8 is a schematic diagram illustrating an exemplary image fusion algorithm according to some embodiments of the present disclosure.

FIG. 8 is a schematic diagram illustrating an exemplary image fusion algorithm according to some embodiments of the present disclosure.

Referring to FIG. 8, a black-and-white edge correction algorithm provided by the embodiments of the present disclosure is mainly implemented between a multi-scale decomposition step and a coefficient fusion step in the image fusion algorithm. Based on low-frequency images and high-frequency images obtained after multi-scale decomposition operation(s), the processing engine 110 may perform a black-and-white edge correction operation on a first high-frequency image, and obtain a new first high-frequency image, and finally perform the multi-scale reconstruction operation to obtain a fusion image.

In some embodiments, the operations utilized in the registration process may include correcting pixel positions of the infrared image to match pixel positions of the visible light image, or correcting pixel positions of the visible light image to match pixel positions of the infrared image, which may not be limited in the present disclosure. In some embodiments, the operations may be performed during a calibration process of the devices (e.g., the visible light sensor and/or the infrared sensor) when the device is being assembled, or may be performed during an off-line calibration process, which may not be limited in the present disclosure. In some embodiments, the algorithm used for the multi-scale decomposition operation(s) may include a pyramid transform algorithm, a wavelet transform algorithm, a bilateral filter algorithm, a guided filter algorithm, or the like, which may not be limited in the present disclosure. In some embodiments, the coefficient fusion algorithm may include a simple weighted average algorithm, or the processing engine 110 may generate a weight map for weighting by using information such as entropy, gradient, acutance, SNR (Signal to Noise Ratio), or the like of the image, which may not be limited in the present disclosure.

Figure 9:
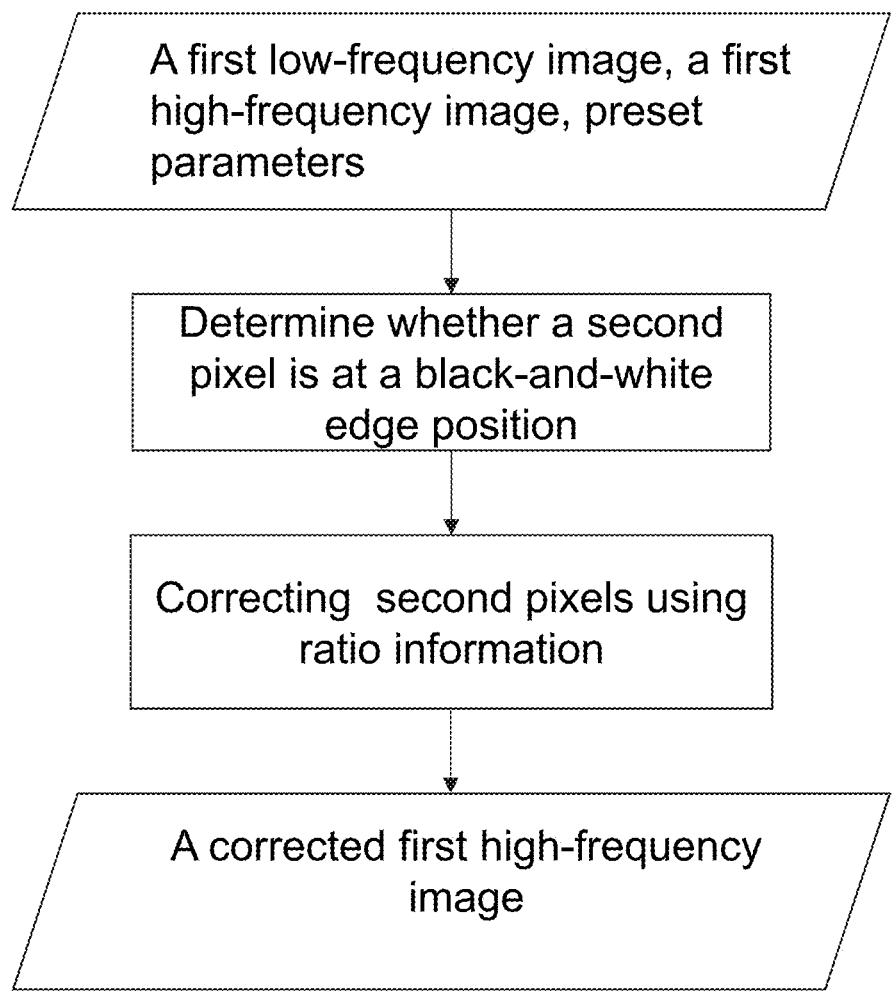
FIG. 9 is a schematic diagram illustrating an exemplary black-and-white edge correction algorithm according to some embodiments of the present disclosure.

FIG. 9 is a schematic diagram illustrating an exemplary black-and-white edge correction algorithm according to some embodiments of the present disclosure.

According to the correct algorithm, for an input first high-frequency image, the processing engine 110 may determine whether each second pixel is in a black-and-white edge region one by one. Furthermore, from top to bottom, from left to right, combining with the low-frequency high-pass filter results of the visible light image, the processing engine 110 may correct the determination about the second pixel that whether each second pixel is in black-and-white edge region according to neighborhood information within a (2r+1)×(2r+1) size around the second pixel in the first high-frequency image. If the pixel is determined to be in the black-and-white edge region, the processing engine 110 may correct the second pixel using ratio information between the high-frequency image and the low-frequency image. If the pixel is not in the black-and-white edge region, the processing engine 110 may not correct the second pixel, and continue to process a next second pixel until the all the second pixel is processed.

FIG. 10, FIG. 11a-11d and FIG. 12 are schematic diagrams illustrating exemplary images with black-and-white edges in prior art.

Figure 10:
FIG. 10 is a schematic diagram illustrating an exemplary image with black-and-white edges according to some embodiments of the present disclosure.
Figure 11A:
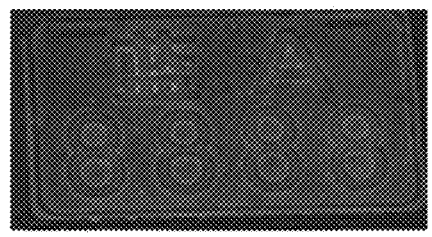
FIGS. 11a-11d are schematic diagrams illustrating exemplary images with black-and-white edges according to some embodiments of the present disclosure.
Figure 11B:
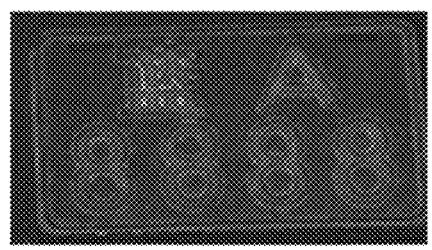
Figure 11C:
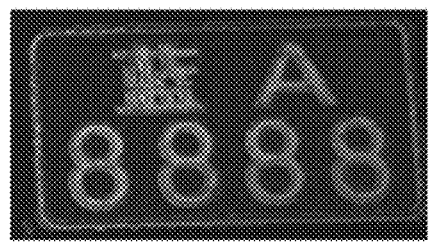
Figure 11D:
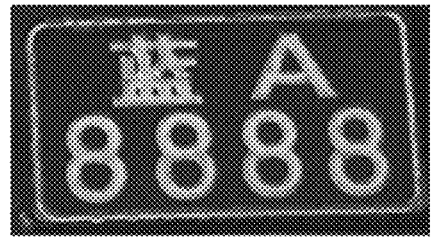
Figure 12:
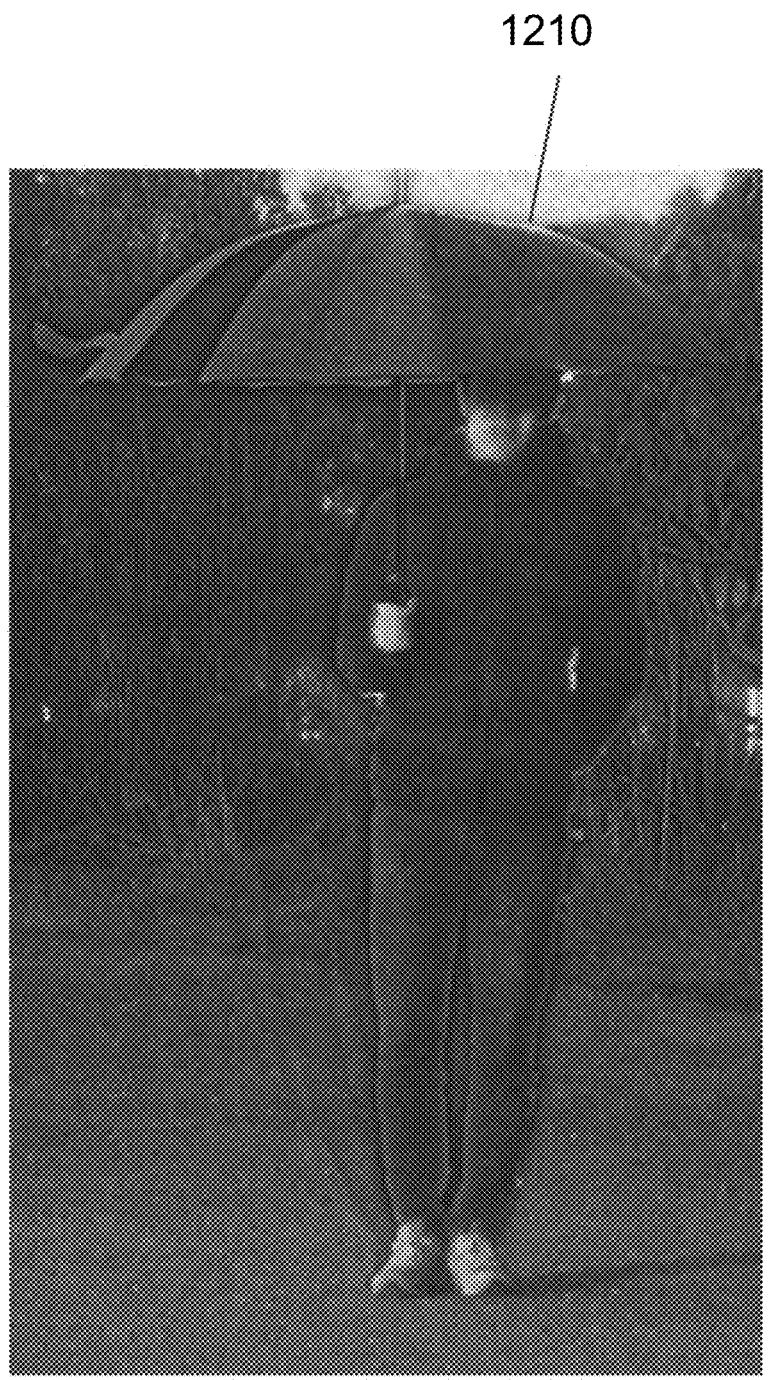
FIG. 12 is a schematic diagram illustrating an exemplary image with black-and-white edges according to some embodiments of the present disclosure.

As shown in FIG. 10, FIG. 11a-11d and FIG. 12, there may be distinct white edges on edges of leaves 1010 in FIG. 10. FIGS. 11a-11d show images of a license plate at different brightness. The brightness increases from FIG. 11a to FIG. 11d in order. As shown in FIG. 11a-11d, for each brightness, edges of the characters on the license plate may have a distinct black edges. As shown in FIG. 12, the edges of the human body and of the umbrella may have obvious white edges 1210.

Figure 13:
FIG. 13 is a schematic diagram illustrating an exemplary fusion image corresponding to FIG. 10 according to some embodiments of the present disclosure.
Figure 14A:
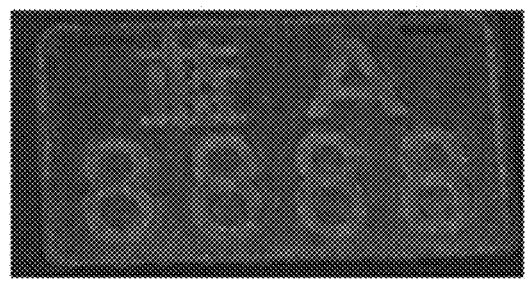
FIGS. 14a-14d are schematic diagrams illustrating exemplary fusion images corresponding to FIG. 11a-11d according to some embodiments of the present disclosure.
Figure 14B:
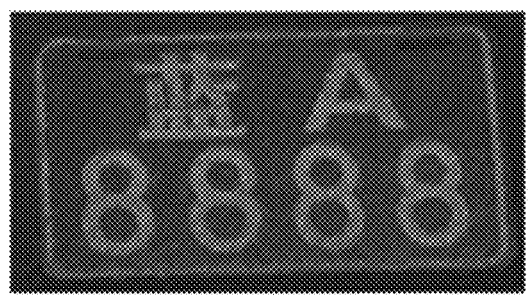
Figure 14C:
Figure 14D:
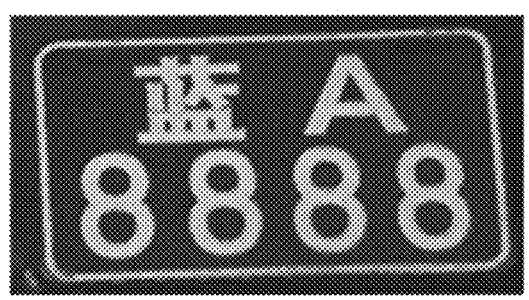

FIG. 13 is a schematic diagram illustrating an exemplary fusion image corresponding to FIG. 10 according to some embodiments of the present disclosure. FIGS. 14a-14d are schematic diagrams illustrating exemplary fusion images corresponding to FIGS. 11a-11d according to some embodiments of the present disclosure. And FIG. 15 is a schematic diagram illustrating an exemplary fusion image corresponding to FIG. 12 according to some embodiments of the present disclosure.

Figure 15:
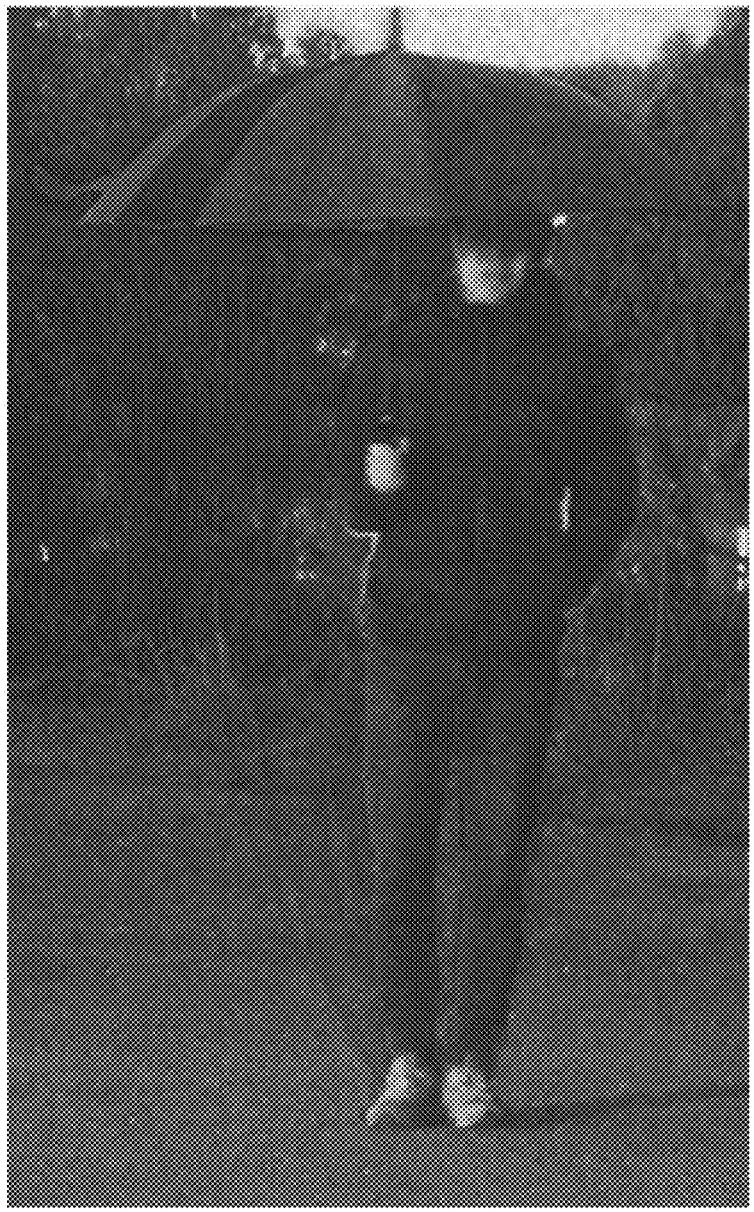
FIG. 15 is a schematic diagram illustrating an exemplary fusion image corresponding to FIG. 12 according to some embodiments of the present disclosure.

Referring to FIG. 13, FIGS. 14a-14d and FIG. 15, FIG. 13 illustrates a fusion image obtained by suppressing the black-and-white edges using the image processing method described in the present disclosure on the image shown in FIG. 10. FIGS. 14a-14d illustrate fusion images obtained by suppressing the black-and-white edges using the image processing method described in the present disclosure on the images shown in FIGS. 11a-11d. FIG. 15 illustrates a fusion image obtained by suppressing the black-and-white edges using the image processing method described in the present disclosure on the image shown in FIG. 12. Comparing FIG. 10 and FIG. 13, FIGS. 11a-11d and FIGS. 14a-14d, FIG. 12 and FIG. 15, it may be seen that the black-and-white edges are all eliminated.

According to the detailed disclosure above, after performing multi-scale decomposition operation(s) on the first image and the second image, the processing engine 110 may determine, for each pixel, whether the pixel is in a featuring region according to the multi-scale decomposition results. If yes, the processing engine 110 may further correct the first high-frequency image according to the multi-scale decomposition results. In this way, the problem that the pixels in the featuring region form a difference in brightness after an image fusion may be avoided, and the black-and-white edges in the fusion image may be effectively suppressed, so that the overall rendering effect of the fusion image may be more natural.

In addition, the processing engine 110 may obtain a product of the first high-frequency image and the filtering results of the first low-frequency image, and further compare the product with a preset parameter to determine whether each pixel is included in the featuring region. The processing engine 110 may also use a guided filtering technique to perform a correction operation, which may avoid the edge discontinuity caused by noise interference under low illumination, and achieve precise positioning of the featuring region. Thus, the occurrence of black-and-white edges may be suppressed more accurately, and a fusion image with more natural rendering effect may be obtained.

Moreover, when correcting the first high-frequency image in the featuring region, the processing engine 110 may perform the correction operation using a window rule according to the ratio of the high-pass filtering result of the first low-frequency image to the first high-frequency image, which may avoid excessive or too small adjustments. Thus, the occurrence of black-and-white edges may be suppressed more accurately, and a fusion image with more natural rendering effect may be obtained.

It should be noted that, black-and-white edges may mostly appear in multi-scale based fusion architectures. However, the method provided in the present disclosure is not limited to the multi-scale based fusion scenario, and the black-and-white edges in other scenarios may also be suppressed by referring to the present disclosure.

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure. Therefore, it may be emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that may be not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object to be recognized oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local part network (LAN) or a wide part network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

We claim:

1. A method for generating a fusion image, implemented on a device including at least one processor and at least one storage device, the method comprising:
obtaining a first image and a second image of a same scene, wherein pixels of at least a part of the first image corresponding to pixels of at least a part of the second image;
generating, based on the first image, a first low-frequency image corresponding to a low-frequency component of the first image, the first low-frequency image including a plurality of first pixels;
generating, based on the second image, a first high-frequency image corresponding to a high-frequency component of the second image, the first high-frequency image including a plurality of second pixels, the plurality of second pixels corresponding to the plurality of first pixels;
determining, based on the first low-frequency image and the first high-frequency image, a featuring region in the first high-frequency image, wherein the featuring region and a region of the first image that corresponds to the featuring region have different luminance transition trends;
correcting the second pixels in the featuring region based at least in part on the first low-frequency image; and
generating a fusion image based at least in part on the first low-frequency image and the first high-frequency image.

2. The method of claim 1, further comprising:
generating, based on the first image, a second high-frequency image corresponding to a high-frequency component of the first image; and
generating, based on the second image, a second low-frequency image corresponding to a low-frequency component of the second image, wherein the fusion image is generated based further on the second high-frequency image and the second low-frequency image.

3. The method of claim 2, wherein the generating the fusion image includes:
generating a third low-frequency image by fusing the first low-frequency image and the second low-frequency image;
generating a third high-frequency image by fusing the first high-frequency image and the second high-frequency image; and
generating the fusion image by combining the third low-frequency image and the third high-frequency image.

4. The method of claim 1, wherein the determining, based on the first low-frequency image and the first high-frequency image, a featuring region in the first high-frequency image includes:
obtaining a first matrix by performing a high-pass filtering on the first low-frequency image, wherein the first matrix includes a plurality of first elements, and the plurality of first elements correspond to the plurality of first pixels;
obtaining a second matrix based on the plurality of first elements and the plurality of second pixels, wherein the second matrix includes a plurality of second elements corresponding to the plurality of second pixels, and each of the plurality of second elements is determined based on a sign of the corresponding first element and a sign of the corresponding second pixel; and
determining the featuring region based at least in part on the second matrix.

5. The method of claim 4, wherein the determining the featuring region based at least in part on the second matrix includes:

obtaining a third matrix by performing a filtering technique on the second matrix according to the first high-frequency image; and determining the featuring region based at least in part on the third matrix.

6. The method of claim 5, wherein:

the third matrix includes a plurality of third elements corresponding to the plurality of second pixels; and the determining the featuring region based at least in part on the third matrix includes:

for each of the plurality of second pixels:

determining whether a pixel value of the second pixel satisfies a first predetermined condition;

determining whether a value of the corresponding third element satisfies a second predetermined condition;

upon a determination that both the first predetermined condition and the second predetermined condition are satisfied, determining that the second pixel is included in the featuring region; and upon a determination that at least one of the first predetermined condition or the second predetermined condition is not satisfied, determining that the second pixel is not included in the featuring region.

7. The method of claim 4, wherein the correcting the second pixels in the featuring region based at least in part on the first low-frequency image includes:

correcting the second pixels in the featuring region based at least in part on the first matrix.

8. The method of claim 7, wherein the correcting the second pixels in the featuring region based at least in part on the first matrix includes:

obtaining a fourth matrix based on the first matrix and the first high-frequency image, wherein the fourth matrix includes a plurality of fourth elements corresponding to the plurality of second pixels, and each of the plurality of fourth elements is determined based on a ratio of a value of the corresponding first element to a pixel value of the corresponding second pixel; and correcting the second pixels in the feature region by correcting the first high-frequency image based on the fourth matrix.

9. The method of claim 8, wherein the correcting the first high-frequency image based on the fourth matrix includes:

obtaining a weight matrix based on the fourth matrix, wherein:

the weight matrix includes a first plurality of weights corresponding to the plurality of fourth elements;

the first plurality of weights include a second plurality of weights, the second plurality of weights corresponding to the second pixels in the featuring region; and each of the second plurality of weights is determined based on a value range of the fourth elements adjacent to the fourth element that corresponds to the weight; and correcting the first high-frequency image using the weight matrix.

10. The method of claim 9, wherein:

the first plurality of weights further include a third plurality of weights, the third plurality of weights corresponding to the second pixels outside the featuring region; and each of the third plurality of weights is set as 1.

11. The method of claim 9, wherein the correcting the first high-frequency image using the weight matrix includes:

for each of the plurality of second pixels:

multiplying a current pixel value of the second pixel by a weight of the weight matrix that corresponds to the second pixel.

12. The method of claim 1, wherein the first image and the second image are obtained via different types of sensors.

13. A system for generating a fusion image, comprising:

at least one storage medium including a set of instructions; and at least one processor in communication with the at least one storage medium, wherein when executing the instructions, the at least one processor is configured to direct the system to perform operations including:

obtaining a first image and a second image of a same scene, wherein pixels of at least a part of the first image corresponding to pixels of at least a part of the second image;

generating, based on the first image, a first low-frequency image corresponding to a low-frequency component of the first image, the first low-frequency image including a plurality of first pixels;

generating, based on the second image, a first high-frequency image corresponding to a high-frequency component of the second image, the first high-frequency image including a plurality of second pixels, the plurality of second pixels corresponding to the plurality of first pixels;

determining, based on the first low-frequency image and the first high-frequency image, a featuring region in the first high-frequency image, wherein the featuring region and a region of the first image that corresponds to the featuring region have different luminance transition trends;

correcting the second pixels in the featuring region based at least in part on the first low-frequency image; and generating a fusion image based at least in part on the first low-frequency image and the first high-frequency image.

14. The system of claim 13, the at least one processor is further configured to direct the system to perform operations comprising:

generating, based on the first image, a second high-frequency image corresponding to a high-frequency component of the first image; and generating, based on the second image, a second low-frequency image corresponding to a low-frequency component of the second image, wherein the fusion image is generated based further on the second high-frequency image and the second low-frequency image.

15. The system of claim 14, wherein the generating the fusion image includes:

generating a third low-frequency image by fusing the first low-frequency image and the second low-frequency image;

generating a third high-frequency image by fusing the first high-frequency image and the second high-frequency image; and generating the fusion image by combining the third low-frequency image and the third high-frequency image.

16. The system of claim 13, wherein the determining, based on the first low-frequency image and the first high-frequency image, a featuring region in the first high-frequency image includes:

obtaining a first matrix by performing a high-pass filtering on the first low-frequency image, wherein the first matrix includes a plurality of first elements, and the plurality of first elements correspond to the plurality of first pixels;

obtaining a second matrix based on the plurality of first elements and the plurality of second pixels, wherein the second matrix includes a plurality of second elements corresponding to the plurality of second pixels, and each of the plurality of second elements is determined based on a sign of the corresponding first element and a sign of the corresponding second pixel; and determining the featuring region based at least in part on the second matrix.

17. The system of claim 16, wherein the determining the featuring region based at least in part on the second matrix includes:

obtaining a third matrix by performing a filtering technique on the second matrix according to the first high-frequency image; and determining the featuring region based at least in part on the third matrix.

18. The system of claim 17, wherein:

the third matrix includes a plurality of third elements corresponding to the plurality of second pixels; and the determining the featuring region based at least in part on the third matrix includes:

for each of the plurality of second pixels:

determining whether a pixel value of the second pixel satisfies a first predetermined condition;

determining whether a value of the corresponding third element satisfies a second predetermined condition;

upon a determination that both the first predetermined condition and the second predetermined condition are satisfied, determining that the second pixel is included in the featuring region; and upon a determination that at least one of the first predetermined condition or the second predetermined condition is not satisfied, determining that the second pixel is not included in the featuring region.

19. The system of claim 16, wherein the correcting the second pixels in the featuring region based at least in part on the first low-frequency image includes:

correcting the second pixels in the featuring region based at least in part on the first matrix.

20. A non-transitory computer readable medium, comprising at least one set of instructions, wherein when executed by at least one processor, the at least one set of instructions direct the at least one processor to effectuate a method, the method comprising:

obtaining a first image and a second image of a same scene, wherein pixels of at least a part of the first image corresponding to pixels of at least a part of the second image;

generating, based on the first image, a first low-frequency image corresponding to a low-frequency component of the first image, the first low-frequency image including a plurality of first pixels;

generating, based on the second image, a first high-frequency image corresponding to a high-frequency component of the second image, the first high-frequency image including a plurality of second pixels, the plurality of second pixels corresponding to the plurality of first pixels;

determining, based on the first low-frequency image and the first high-frequency image, a featuring region in the first high-frequency image, wherein the featuring region and a region of the first image that corresponds to the featuring region have different luminance transition trends;

correcting the second pixels in the featuring region based at least in part on the first low-frequency image; and generating a fusion image based at least in part on the first low-frequency image and the first high-frequency image.

\* \* \* \* \*